(12) United States Patent
Kim

(10) Patent No.: US 9,443,263 B1
(45) Date of Patent: Sep. 13, 2016

(54) TRAVEL DESTINATION ONE STOP SHOPPING SYSTEM BASED ON 3D PANORAMIC IMAGE AND CONTROL METHOD THEREOF

(71) Applicant: Young Duck Kim, Seoul (KR)

(72) Inventor: Young Duck Kim, Seoul (KR)

( * ) Notice: Subject to any disclaimer, the term of this patent is extended or adjusted under 35 U.S.C. 154(b) by 0 days.

(21) Appl. No.: 15/066,922

(22) Filed: Mar. 10, 2016

(30) Foreign Application Priority Data

Jun. 15, 2015 (KR) ........................ 10-2015-0083889

(51) Int. Cl.
| | |
|---|---|
| *G06Q 30/00* | (2012.01) |
| *G06Q 30/06* | (2012.01) |
| *G06Q 20/20* | (2012.01) |
| *G06T 11/60* | (2006.01) |
| *G06K 9/18* | (2006.01) |
| *G06T 15/00* | (2011.01) |
| *G06T 7/00* | (2006.01) |

(52) U.S. Cl.
CPC ............. *G06Q 30/0635* (2013.01); *G06K 9/18* (2013.01); *G06Q 20/202* (2013.01); *G06T 7/001* (2013.01); *G06T 11/60* (2013.01); *G06T 15/00* (2013.01); *G06Q 30/0609* (2013.01); *G06T 2200/04* (2013.01); *G06T 2207/30108* (2013.01)

(58) Field of Classification Search
CPC ................................................ G06Q 30/0609
USPC ..................................................... 705/26.35
See application file for complete search history.

(56) References Cited

U.S. PATENT DOCUMENTS

| | | | | |
|---|---|---|---|---|
| 2011/0282789 | A1* | 11/2011 | Carroll ................... | G06Q 20/18 705/44 |
| 2013/0113827 | A1* | 5/2013 | Forutanpour ......... | G06T 3/4038 345/633 |

FOREIGN PATENT DOCUMENTS

| | | |
|---|---|---|
| JP | 2012-190094 | 10/2012 |
| KR | 10-2001-0068036 | 7/2001 |
| KR | 10-2010-0007511 | 1/2010 |

* cited by examiner

*Primary Examiner* — Hunter Wilder
(74) *Attorney, Agent, or Firm* — East West Law Group; Heedong Chae

(57) ABSTRACT

Disclosed are a travel destination one stop shopping system based on 3D panoramic image and a control method thereof. That is, a virtual reality is implemented by making a tag associated with a corresponding product or store be included in a 3D panoramic image of products displayed at a store or a small store on a road view without an online shopping mall, interested product purchase and delivery functions are performed through providing information on the product or store associated with the selected tag when the tag associated with the product or store is selected, shopping information of a corresponding area is previously collected and verified based on the 3D panoramic image before departing for a travel destination, and performs a payment function of a traveler dedicated prepaid multi-product discount coupon as necessary.

7 Claims, 15 Drawing Sheets

TRAVEL DESTINATION ONE STOP SHOPPING SYSTEM BASED ON 3D PANORAMIC IMAGE AND CONTROL METHOD THEREOF

CROSS-REFERENCE TO RELATED APPLICATION

This application claims the benefit of Korean Application No. 10-2015-0083889, filed on Jun. 15, 2015 with the Korean Intellectual Property Office, the disclosure of which is incorporated herein by reference.

BACKGROUND OF THE INVENTION

1. Field of the Invention

The present invention relates to a travel destination one stop shopping system based on a 3D panoramic image and a control method thereof, and particularly, to a travel destination one stop shopping system based on a 3D panoramic image and a control method thereof which implement a virtual reality by making a tag associated with a corresponding product or store be included in a 3D panoramic image of products displayed at a store or a store on a road view for the street, perform interested product purchase and delivery functions through providing information on the product or store associated with the selected tag when the tag associated with the product or store is selected, previously collect and verify shopping information of a corresponding area based on the 3D panoramic image before departing for a travel destination, and perform a payment function of a traveler dedicated prepaid multi-product discount coupon.

2. Description of the Related Art

A panoramic image means an image achieved by synthesizing multiple images of a subject.

When the panoramic image is applied to an Internet shopping mall, an offline situation is implemented as an online virtual reality and schematic product information regarding products or stores included in the panoramic image is just provided and product information provided offline implemented as a virtual reality is just provided, and as a result, the panoramic image just serves as a shopping assistance means.

Prior Art Document

[Patent Document] Korean Patent Publication No. 10-2013-0084274 "3D Virtual-reality Internet Shopping Mall".

SUMMARY OF THE INVENTION

An object of the present invention is to provide a travel destination one stop shopping system based on a 3D panoramic image and a control method thereof which implement a virtual reality by making a tag associated with a corresponding product or store be included in a 3D panoramic image of products displayed at a store or a store on a road view for the street.

Another object of the present invention is to provide a travel destination one stop shopping system based on a 3D panoramic image and a control method thereof, which provide information on the product or store associated with the selected tag when the tag associated with the product or store is selected in the 3D panoramic image including the tag associated with the product or store and perform a payment function of a traveler dedicated prepaid multi-product discount coupon corresponding the information on a specific product or store in the information on the provided product or store.

According to an aspect of the present invention, a travel destination one stop shopping system based on a 3D panoramic image includes: a purchase terminal transmitting, when a specific code included in 3D panoramic image information transmitted from a server is selected to correspond to member information, unique identification information of the selected specific code and identification information of the purchase terminal to the server; and the server verifying one or more product and service information corresponding to the unique identification information of the specific code among product and service information for each code, which is pre-stored and transmitting the verified one or more product and service information to the purchase terminal.

Preferably, the member information may include at least one of a name, an address, a used language, delivery destination information, travel destination information, and a shopping object type.

Preferably, the product and service information may include at least one of a product name, a service name, a product unique code, a service unique code, a product image, a service base image, product description information, service description information, experience information for a product/service, and evaluation information for the product/service.

Preferably, the server may photograph each of a first image and a second image including at least one of one or more stores on an offline, products, points of purchases, leaflets, banner advertisements, board advertising, billing, signs, and price tags through a plurality of cameras, acquire an overlapping area where the first image and the second image overlap with each other based on the orientation of pixels with respect to the photographed first image and second image, generate a preliminary panoramic image by synthesizing the first image and the second image based on the acquired overlapping area, recognize each of at least one of stores, points of purchases, leaflets, banner advertisements, board advertising, billing, signs, and price tags included in the preliminary panoramic image, and add codes corresponding to the recognized one or more objects, respectively to a partial area of an object in the preliminary panoramic image or add the codes to be adjacent to the object to generate the 3D panoramic image.

Preferably, the codes may be any one form of a barcode, a QR code, and a letter string code and include at least one of one or more product information and one or more service information associated with the recognized object.

Preferably, the purchase terminal may display one or more product and service information transmitted from the server, and may transmit delivery information including any one of a parcel service, multi-product discount coupon issuing, and spot receipt to the server.

Preferably, the purchase terminal applies a predetermined discount price to a cover price corresponding to at least one specific product and service information selected among the one or more product and service information, by interlocking with the purchase terminal, a payment server, and a selling terminal, to perform the payment function for a price acquired, by applying the discount price to the cover price.

Preferably, the purchase terminal may receive a clearance list transmitted from the server after the payment function is normally completed and display the received clearance list, and the clearance list may include at least one of a product name for a specific product corresponding to the at least one specific product information, unique identification information of the product, a harmonized commodity description and coding system (HS) code, a delivery fee, and tax fare information.

According to another aspect of the present invention, a control method of a travel destination one stop shopping system based on a 3D panoramic image may include: transmitting to a server member information including at least one of a name, an address, a used language, delivery destination information, travel destination information, and a shopping object type through a purchase terminal; transmitting 3D panoramic image information corresponding to travel destination information in the member information to the purchase terminal through the server; transmitting, when a specific code included in the 3D panoramic image information is selected, unique identification information of the selected specific code and identification information of the purchase terminal to the server through the purchase terminal; verifying one or more product and service information corresponding to the unique identification information of the specific code among product and service information for each code, which is pre-stored and transmitting the verified one or more product and service information to the purchase terminal, through the server; displaying the one or more product and service information through the purchase terminal; transmitting delivery information including any one of a parcel service to a domestic or foreign area, multi-product discount coupon issuing, and spot receipt to the server through the purchase terminal; applying a predetermined discount price to a cover price corresponding to at least one specific product and service information selected among the one or more product and service information by interlocking with the purchase terminal, a payment server, and a selling terminal, to perform the payment function for a price acquired by applying the discount price to the cover price, through the purchase terminal, when at least one specific product and service information are selected from the one or more product and service information; and displaying a clearance list transmitted from the server when the payment function is normally completed through the purchase terminal.

Preferably, the 3D panoramic image information may be generated through a process of photographing each of a first image and a second image including at least one of one or more stores on an offline, products in the stores, points of purchases, leaflets, banner advertisements, board advertising, billing, signs, and price tags through a plurality of cameras, through the server; a process of acquiring an overlapping area where the first image and the second image overlap with each other based on the orientation of pixels with respect to the photographed first image and second image, through the server; a process of generating a preliminary panoramic image by synthesizing the first image and the second image based on the acquired overlapping area through the server; a process of recognizing each of at least one of stores, points of purchases, leaflets, banner advertisements, board advertising, billing, signs, and price tags included in the preliminary panoramic image through the server; and a process of adding codes corresponding to the recognized one or more objects, respectively to a partial area of an object in the preliminary panoramic image or adding the codes to be adjacent to the object to generate the 3D panoramic image through the server, and the codes may be any one form of a barcode, a QR code, and a letter string code and include at least one of one or more product information and one or more service information associated with the recognized object.

According to the present invention, a virtual reality is implemented by making a tag associated with a corresponding product or store be included in a 3D panoramic image of products displayed at a store or a store on a road view for the street, and as a result, additional information regarding offline including small shops or traditional markets on a street without an online shopping mall is transferred through the tag while providing views encountered in actual, department stores, shopping malls, streets, and the like as they are to thereby provide various information to users.

Further, when the tag associated with the product or store is selected in the 3D panoramic image including the tag associated with the product or store, information on the product or store associated with the selected tag and shopping information of a corresponding area are previously collected and verified based on the 3D panoramic image before departing for a travel destination and a product purchase function through the 3D panoramic image and a delivery to a desired area can be performed as necessary, and a payment function of a traveler dedicated prepaid multi-product discount coupon corresponding on information on a specific product or store which can be used in the travel destination among the provided information on the products or stores is performed, and as a result, users can purchase the products at lower price than natives when the user travels foreign countries, thereby improving satisfaction and convenience of a user of a corresponding terminal, which is a traveler.

In addition, shopping information of products of small shops and traditional markets on streets without an online shopping malls is provided online at home and abroad and selling and delivery functions are performed based on the 3D panoramic image to bring about a new inflection point which exceeds a conventional concept on an online electronic commerce field through a new business scheme which can satisfy both a purchaser and a seller.

DETAILED DESCRIPTION OF THE PREFERRED EMBODIMENTS

Figure 1:
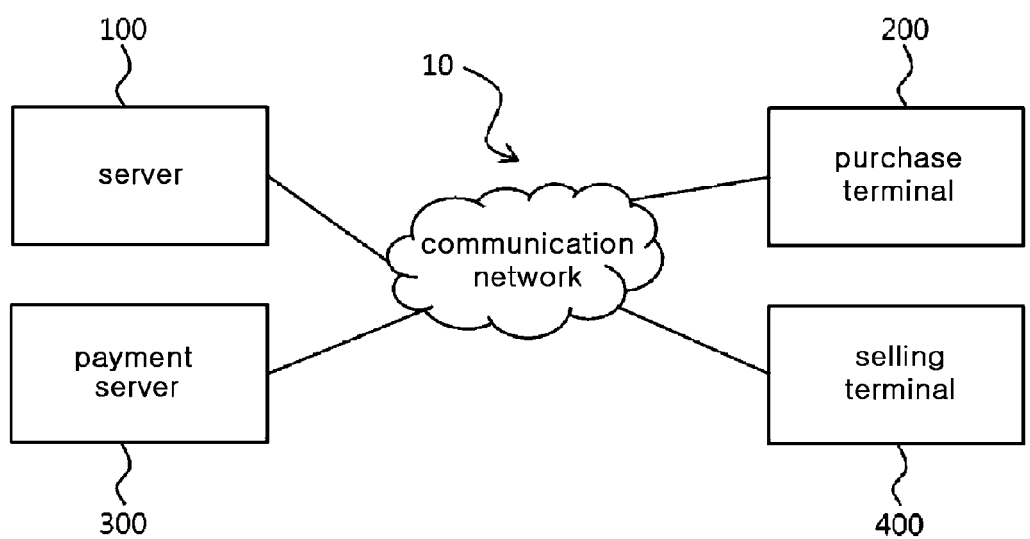
FIG. 1 is a block diagram illustrating a configuration of a travel destination one stop shopping system based on a 3D panoramic image according to an embodiment of the present invention.

Technical terms used in the present invention are used only to describe specific embodiments, and are not intended to limit the present invention. Further, unless otherwise defined, the technical terms used in the present invention should be interpreted as meanings generally appreciated by those skilled in the art and should not be interpreted as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

Further, singular expressions used in the present invention include plural expressions unless they have definitely opposite meanings in the context. In the present invention, a term such as "comprising" or "including" should not be interpreted as necessarily including all various components or various steps disclosed in the invention, and it should be interpreted that some component or some steps among them may not be included or additional components or steps may be further included.

Further, terms including an ordinary number, such as first and second, and the like are used for describing various components, but the components are not limited by the terms. The terms are used only for distinguishing one component from another component. For example, a first component may be referred to as a second component, and similarly, the second component may be referred to as the first component without departing from the scope of the present invention.

Hereinafter, embodiments of the present invention will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present disclosure. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a travel destination one stop shopping system 10 based on a 3D panoramic image according to an embodiment of the present invention.

As illustrated in FIG. 1, the travel destination one stop shopping system 10 is constituted by a server 100, a purchase terminal 200, a payment server 300, and a selling terminal 400. All constituent elements of the travel destination one stop shopping system 10 illustrated in FIG. 1 are not required, and the travel destination one stop shopping system 10 may also be implemented by constituent elements which are more or fewer than the constituent elements illustrated in FIG. 1.

The purchase terminal 200 and/or the selling terminal 400 may be applied to various terminals such as a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device (for example, including a smartwatch, a smart glass, a head mounted display (HMD), and the like), a Wibro terminal, an Internet protocol television (IPTV) terminal, a smart TV, a digital broadcasting terminal, an audio video navigation (AVN) terminal, an audio/video (A/V) system, and a flexible terminal. Herein, the selling terminal 400 may be a point of sales (POS) terminal provided in a store, and the like.

Further, each of the server 100, the purchase terminal 200, the payment server 300, and the selling terminal 400 may include a communication unit for communication connection with a predetermined internal component or at least one predetermined external terminal through a wire/wireless communication network. Herein, a wireless Internet technology may include wireless LAN (WLAN), wireless broadband (Wibro), world interoperability for microwave access (Wimax), high speed downlink packet access (HSDPA), IEEE 802.16, long term evolution (LTE), a wireless mobile broadband service (WMBS), and the like. Further, a short range communication technology may include Bluetooth, Wi-Fi, radio frequency identification (RFID), infrared data association (IrDA), ultra wideband (UWB), ZigBee, near field communication (NFC), ultra sound communication (USC), visible light communication (VLC), Bluetooth low energy (BLE), and the like. In addition, a wired communication technology may include power line communication (PLC), USB communication, Ethernet, serial communication, optical/coaxial cable, and the like.

Further, the communication unit may transmit information with a predetermined terminal through a universal serial bus (USB).

Moreover, the communication unit transmits and receives a wireless signal to and from a base station, the purchase terminal 200, the server 100, the payment server 300, and the selling terminal 400 on a mobile communication network constructed according to technical standards for mobile communication or communication schemes (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), or the like).

Besides, each of the server 100, the purchase terminal 200, the payment server 300, and the selling terminal 400 may include a storage unit. Herein, the storage unit stores various user interfaces (UI), graphic user interfaces (GUI), and the like.

Further, the storage unit stores data and programs required for the server 100, the purchase terminal 200, the payment server 300, and the selling terminal 400 to operate, respectively.

That is, the storage unit may store multiple application programs or applications driven the server 100, the purchase terminal 200, the payment server 300, and the purchase terminal 400 and data and commands for operating the server 100, the purchase terminal 200, the payment server 300, and the purchase terminal 400. At least some of the application programs may be downloaded from an external server through wireless communication. Further, at least some of the application programs may exist on the server 100, the purchase terminal 200, the payment server 300, and the purchase terminal 400 from a release time for principal functions (for example, phone receipt, transmitting function, message receipt, and sending function) of the server 100, the purchase terminal 200, the payment server 300, and the purchase terminal 400. Meanwhile, the application programs may be stored in the storage unit and installed in the server 100, the purchase terminal 200, the payment server 300, and the purchase terminal 400, respectively to be driven for performing the respective operations (alternatively, functions) of the server 100, the purchase terminal 200, the payment server 300, and the purchase terminal 400 by the control unit (not illustrated).

Further, the storage unit may include at least one storage medium of a flash memory type, a hard disk type, a multimedia card micro type, a card type memory (for example, an SD or XD memory, or the like), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Further, the server 100, the purchase terminal 200, the payment server 300, and the purchase terminal 400 may operate a web storage performing a storage function of the storage unit on the Internet or also operate in association with the web storage.

Besides, each of the server 100, the purchase terminal 200, the payment server 300, and the selling terminal 400 may include a display unit. Herein, the display unit may include at least one of a liquid a liquid crystal display (LCD), a thin film transistor-liquid crystal display (TFT LCD), an organic light-emitting diode (OLED), a flexible display, a 3D display, an electronic ink (e-ink) display, and a light emitting diode (LED). Further, the display unit may be a touch screen.

Besides, each of the server 100, the purchase terminal 200, the payment server 300, and the selling terminal 400 may include a voice output unit. Herein, the voice output unit outputs voice information included in a signal subjected to predetermined signal processing by control by the control unit. Here, the voice output unit may include a receiver, a speaker, a buzzer, and the like. Further, the voice output unit outputs a guide voice generated by the control unit.

Besides, each of the server 100, the purchase terminal 200, the payment server 300, and the selling terminal 400 may include the control unit. Herein, the control unit executes overall control functions of the server 100, the purchase terminal 200, the payment server 300, and the selling terminal 400, respectively.

Further, the control unit executes overall control functions of the server 100, the purchase terminal 200, the payment server 300, and the selling terminal 400 by using the programs and data stored in the storage unit. The control unit may include a RAM, a ROM, a CPU, a GPU, and a bus, and the RAM, the ROM, the CPU, the GPU, and the like may be connected to each other through the bus. The CPU accesses the storage unit to perform booting by using an O/S stored in the storage unit and perform various operations by using various programs, contents, data, and the like stored in the storage unit.

The server 100 communicates with the purchase terminal 200, the payment server 300, the selling terminal 400, and the like.

Further, the server 100 performs a member joining procedure for a user of the purchase terminal 200 by interlocking with the purchase terminal 200.

Further, the server 100 performs the member joining procedure for a user of the selling terminal 400 by interlocking with the selling terminal 400.

Further, the server 100 photographs a first image and a second image including one or more stores, products in the corresponding stores, points of purchases, leaflets, banner advertisements, board advertising, billing, signs, price tags, and the like online through a plurality of cameras (not illustrated) included in the corresponding server 100. Herein, the stores include department store, shopping malls, outlets, restaurants, hospitals, buildings (alternatively, constructions), and the like.

Further, the server 100 acquires an overlapping area where the first image and the second image overlap with each other based on the orientation of pixels with respect to the photographed first image and second image.

In the exemplary embodiment of the present invention, it is described that the first image and the second image are synchronized with each other based on the acquired overlapping area to generate a preliminary panoramic image, but the present invention is not limited thereto and the server 100 synthesizes the photographed first and second images by previously known various synthesis methods to generate the preliminary panoramic image.

In this case, the server may also generate the preliminary panoramic image based on the first and second images photographed through a plurality of cameras (for example, a special device for photographing the 3D panoramic image and a plurality of cameras configured in a special vehicle, and the like) which are separately configured.

Further, the server 100 recognizes each of one or more objects included in the preliminary panoramic image. Herein, the object may also be each store positioned on offline and may include a point of purchase (POP), a leaflet, a banner advertisement, board advertising, billing, a sign, a price tag, and the like positioned on the offline or positioned at each store. In this case, the object in the present invention may be in a state in which a product and a service provided in each store are excluded. Further, the POP, the leaflet, the banner advertisement, the board advertising, the billing, the sign, and the like represent a discount event code and the price tag may represent a product code.

That is, the server 100 recognizes each of one or more stores included in the preliminary panoramic image or recognizes each of the POP, the leaflet, the banner advertisement, the board advertising, the billing, the sign, the price tag, and the like included in the preliminary panoramic image.

Figure 2:
FIG. 2 is a diagram illustrating an example of a displayed product according to the embodiment of the present invention.

In this case, as illustrated in FIG. 2, the display products represent display non-selling products displayed for product selling to a customer (for example, including clothes worn in a mannequin, a bag shown and displayed on an exhibition stand, and the like).

Figure 3:
FIG. 3 is a diagram illustrating an example of a point of purchase (POP) according to the embodiment of the present invention.

Further, as illustrated in FIG. 3, the point of purchase (POP) represents an advertisement providing information on the product and/or service to a customer which visits the store on the spot.

Figure 4:
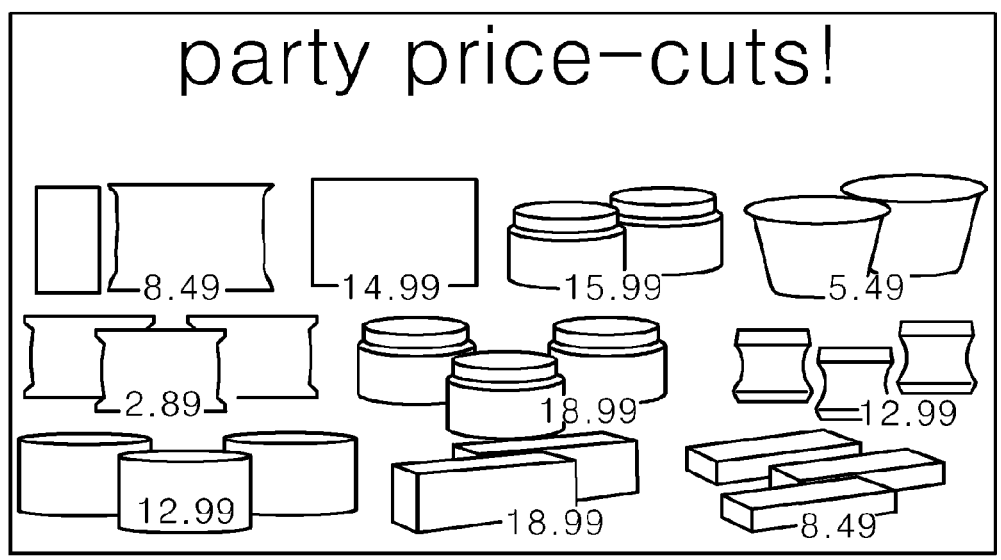
FIG. 4 is a diagram illustrating an example of a leaflet according to the embodiment of the present invention.

In addition, as illustrated in FIG. 4, the leaflet (alternatively, leaflet advertisement/leaflet sheet/leaflet sheet advertisement) represents a simple printed matter type distributed for an advertisement or propagation.

Figure 5:
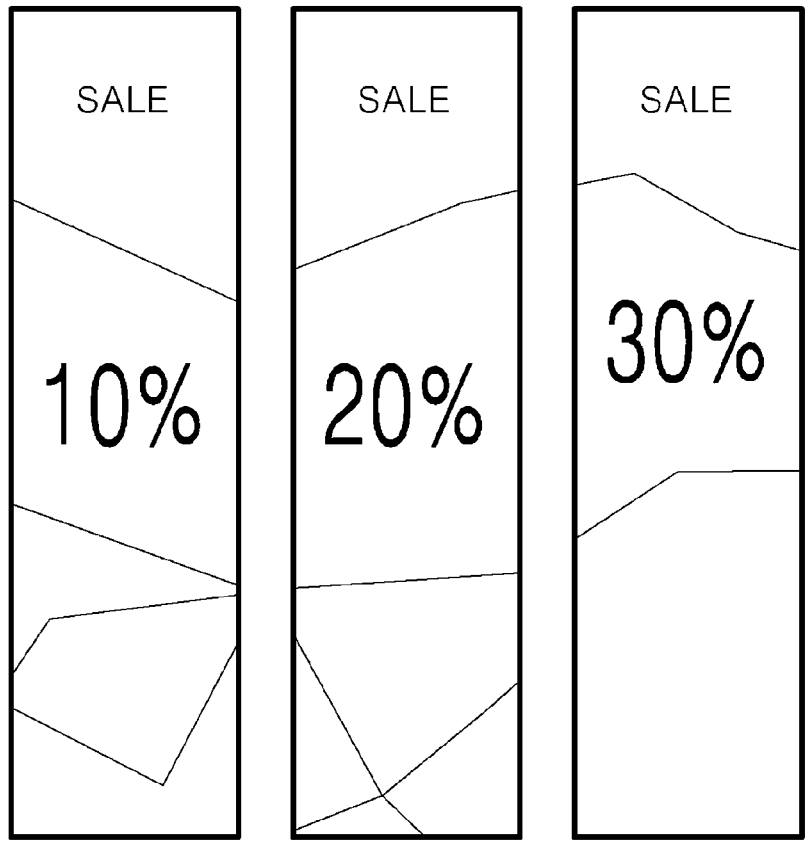
FIG. 5 is a diagram illustrating an example of a banner advertisement according to the embodiment of the present invention.

Further, as illustrated in FIG. 5, the banner advertisement represents an advertisement that is installed at a specific position of the store to provide information on a specific product and/or service.

Figure 6:
FIG. 6 is a diagram illustrating an example of a billing according to the embodiment of the present invention.

Moreover, as illustrated in FIG. 6, the billing represents paper prepared and attached for the advertisement and propagation and since the billing has resort to a viewpoint, the poster advertisement is prepared by considering letters, figures, sentences, and the like so as to attract attention.

Figure 7:
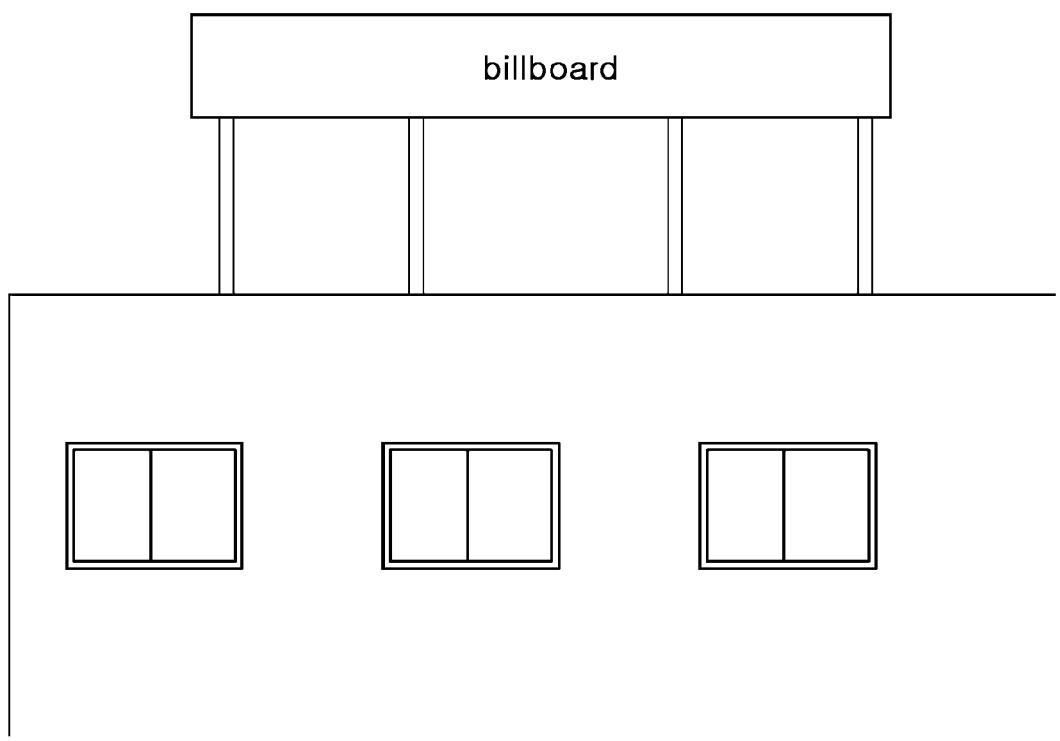
FIG. 7 is a diagram illustrating an example of a sign according to the embodiment of the present invention.

Further, as illustrated in FIG. 7, the sign represents a board displaying a company name, a store name, a product name, a service name, and the like associated with the store.

In addition, the server 100 adds (alternatively, inserts) codes corresponding to one or more recognized objects, respectively to a partial area on the corresponding object in the preliminary panoramic image or adds (alternatively, inserts) the codes to be adjacent to the object to generate the 3D panoramic image. Herein, the codes are types such as a barcode, a QR code, and a letter string code, and include information on one or more products, information on one or more services, and the like, which are associated with the recognized object. Further, the letter string code may be configured by combining letters, numbers, symbols, and the like for each language. In this case, the product information includes a product name, a product unique code, a product image, product description information, experience information on the product, evaluation information for the product, positional information of a store selling the corresponding product, a telephone number of the store, and the like. Further, the service information includes a service name, a service unique code, a service base image, service description information, experience information on the service, evaluation information for the service, positional information of a store providing the corresponding service, the telephone number of the store, and the like.

Besides, the server 100 may also generate the 3D panoramic image for each language by considering a characteristic for each language.

Further, the server 100 receives member information, identification information of the purchase terminal 200, and the like transmitted from the purchase terminal 200. Herein, the member information includes a name, an address, a used language, delivery destination information, travel destination interaction, a shopping object type (including, for example, an avatar type, an emoticon type, and the like), and the like. Further, the identification information of the purchase terminal 200 includes an MDN, a mobile IP, a mobile MAC, subscriber identification module (Sim) card unique information, a serial number, and the like.

In addition, the server 100 transmits 3D panoramic image information corresponding to the travel destination information included in the member information to the purchase terminal 200 based on the received member information. In this case, the sever 100 may also transmit the 3D panoramic image information prepared by the corresponding used language to the purchase terminal 200 based on the used language in the member information. Herein, the 3D panoramic image information may be a state in which one or more codes corresponding to objects including the store, the POP, the leaflet, the banner advertisement, the board advertising, the billing, the sign, the price tag, and the like included in image information of an offline situation, respectively are added to the image information of the actual offline situation. Further, the object is defined while products and services provided in each store included in the image information of the corresponding offline situation are excluded. In addition, the codes corresponding to the objects are types such as a barcode, a QR code, and a letter string code and include information on one or more products, information on one or more services, and the like, which are associated with the objects.

Further, when a specific code included in the 3D panoramic image information is selected, the server 100 receives unique identification information of the selected specific code, the identification information of the purchase terminal 200, and the like transmitted from the purchase terminal 200.

In addition, the server 100 verifies one or more product and service information corresponding to the unique identification information of the received specific code among product and service information for each code which is pre-stored. Herein, the product and service information includes a product name (alternatively, service name), a product unique code (alternatively, service unique code), a product image (alternatively, service base image), product description information (alternatively, service description information), experience information of the product/service, evaluation information for the product/service, and the like. In this case, the product information includes fields including red ginseng, ginseng, cosmetics, home appliances, fashion cloches, miscellaneous goods, jewelry, health supplement food, baby products, laver, kimchi, baking, foods, golf, skis, performance, sports games, and the like. Further, the service information includes fields including a Korean dry sauna, a hot spring, rental car, rental, an aesthetic massage, health, plastic surgery, a service, performance, and the like.

In addition, the server 100 transmits the verified one or more product and service information (alternatively, one or more product and service information corresponding to the unique identification information of the specific code) to the purchase terminal 200.

In the embodiment of the present invention, it is described that the server 100 performs a 3D panoramic image information providing function, a function to provide one or more product and service information corresponding to the unique identification information of the specific code selected by the purchase terminal 200, and the like by a one-to-one scheme with the purchase terminal 200, but the present invention is not limited thereto and the server 100 may also perform the 3D panoramic image information providing function, the function to provide one or more product and service information corresponding to the unique identification information of the specific code, and the like by a friend terminal (not illustrated) invited by the purchase terminal 200 and interlocking with the purchase terminal 200.

That is, the purchase terminal 200 transmits information (including, for example, identification information of the friend terminal, and the like) on one or more friend terminals and the identification information of the purchase terminal 200 and the like to the server 100. Thereafter, the server 100 provides the 3D panoramic image information to the purchase terminal 200 and the one or more friend terminals. In this case, the 3D panoramic image information displayed in the purchase terminal 200 and the one or more friend terminals mutually interworks (alternatively, are synchronized) to display the same 3D panoramic image information on the purchase terminal 200 and the one or more friend terminals and display different 3D panoramic image information on each of the purchase terminal 200 and the one or more friend terminals. Thereafter, when the specific code is selected in the purchase terminal 200 and/or the one or more friend terminals, the server 100 receives the unique identification information of the specific code selected in the purchase terminal 200 and/or the one or more friend terminals. In addition, the server 100 verifies one or more product and service information corresponding to the unique identification information of the received specific code among the product and service information for each code which is pre-stored. Further, the server 100 may transmit the verified one or more product and service information to each of the purchase terminal 200 and/or the one or more friend terminals.

As described above, the server 100, the purchase terminal 200, and one or friend terminals mutually interlock with each other to perform the 3D panoramic image information providing function, the function to provide one or more product and service information corresponding to the unique identification information of the specific code, and the like.

Further, the purchase terminal 200 and one or more friend terminals may also perform a text message service function, a voice service function, and the like by a relay function of the server 100.

Further, the server 100 receives the delivery information, the identification information of the purchase terminal 200, and the like transmitted from the purchase terminal 200. Herein, the delivery information represents a method (alternatively, means) for receiving a product or service paid by the corresponding purchase terminal 200 and includes a parcel service (including, for example, a parcel service through aviation, a ship, and the like) to a domestic and/or foreign area, multi-product discount coupon issuing, spot receipt, and the like.

Further, the server 100 stores the receive delivery information, the identification information of the purchase terminal 200, and the like.

Further, when at least one specific product and service information is selected among one or more product and service information transmitted to the purchase terminal 200, the server 100 performs a payment function for a paid price corresponding to the at least one selected specific product and service information by interlocking with the purchase terminal 200, the payment server 300, and the purchase terminal 400.

That is, the server 100 applies a predetermined discount price to a cover price corresponding to the at least one specific product and service information to perform a payment function for a price to which the discount price in the cover price. Further, the price to which the discount price is applied into the cover price may be a price which is equal to or lower than a lowest price in a corresponding country provided by a specific product or a specific service corresponding to the corresponding specific product and service information.

In this case, in respect to the specific product corresponding to the specific product and service information selected in the purchase terminal 200, when the corresponding specific product corresponds to a predetermined (alternatively, registered) import clearance impossible product (including, for example, meat, goods, weaponry, gas, drug, and the like), the server 100 transmits to the purchase terminal 200 information (alternatively, payment function failure information) indicating that performing the payment function for the specific product and service information is impossible. Herein, the information indicating that performing the payment function is impossible includes information indicating that the specific product corresponding to the specific product and service information corresponds to the import clearance impossible product.

Further, when the corresponding specific product corresponds to a predetermined (alternatively, registered) import clearance impossible product (including, for example, meat, goods, weaponry, gas, drug, and the like), the server 100 finishes the payment function.

Further, the server 100 may normally perform the payment function only when the user of the purchase terminal 200 travels not his/her own county but other countries based on the member information transmitted from the purchase terminal 200 and performs a payment function for specific product and service information provided from stores of the corresponding other countries.

That is, the server 100 performs comparison between a unique country number of a country corresponding to the travel destination information in the member information transmitted from the purchase terminal 200 and a country number of a country corresponding to a passport number associated with the user of the corresponding purchase terminal 200 additionally transmitted from the purchase terminal 200, comparison between the country number of the country corresponding to the travel destination information and a country number of a country corresponding to the identification information of the purchase terminal 200, and comparison between the country number of the country corresponding to the travel destination information and a country number of a country (alternatively, a country name) in which the corresponding purchase terminal 200 based on predetermined positional information of a final-end base station finally connected to the purchase terminal 200 among a plurality of base stations (not illustrated) with respect to the purchase terminal 200 connected through the plurality of base stations and stops the payment function when both numbers are the same as each other.

Further, according to the comparison result, when both numbers are not the same as each other, the server 100 performs the payment function for the specific product or service information.

In addition, after performing the payment function is normally completed, the server 100 provides a payment function performance result (alternatively, payment information) to the purchase terminal 200. Herein, the payment function performance result (alternatively, payment information) includes at least one product and service information, payment date and time information, price information for each ordered product/service, and the like.

In addition, after performing the payment function is normally completed, the server 100 provides to the purchase terminal 200 a specific product or a specific service corresponding to the at least one or more paid specific product and service information based on the delivery information.

That is, when the parcel service is included in the delivery information, the server 100 delivers a coupon corresponding to the specific product or the specific service corresponding to the at least one specific product and service information to the user of the purchase terminal 200 through delivery means including the aviation, the ship, a vehicle, and the like.

Further, when the spot receipt is included in the delivery information, the server 100 transmits to the purchase terminal 200 guidance information, identification code such as a barcode or a QR code type required for the spot receipt of the specific product or specific service together with the payment function performance result. Therefore, when the user of the purchase terminal 200 directly visits a store providing the corresponding specific product or specific service, the selling terminal 400 may authenticate (alternatively, recognizes) the identification code such as the barcode or QR code type stored in the purchase terminal 200 and thereafter, provide the specific product and specific service to the user of the purchase terminal 200.

Further, when the multi-product discount coupon issuing is included in the delivery information, the server 100 issues (alternatively, transmits) a multi-product discount coupon corresponding to the specific product or specific service to the purchase terminal 200.

Herein, the multi-product discount coupon is generated by the server 100.

That is, when performing the payment function is normally completed, the server 100 generates the multi-product discount coupon (alternatively, a multi-service discount coupon/multi-product and service discount coupon) including the cover price, the discount price, and an expiration date corresponding to the specific product and service information, a plurality of product and service item codes (alternatively, a plurality of product and service information associated with the specific product and service information/a plurality of product and service information in the same category as the specific product and service information) associated with the specific product and service information, a unique number (alternatively, a unique number of the multi-product discount coupon), and the like. Herein, the multi-product discount coupon is a state in which a plurality of product and service item codes associated with the specific product and service information is grouped into one code and is generated as the barcode type, the QR code type, a letter string type, or the like. Further, each of the plurality of product and service information includes a product name (alternatively, service name), a product unique code (alternatively, service unique code), a product image (alternatively, service base image), product description information (alternatively, service description information), experience information of the product/service, evaluation information for the product/service, positional information of a store selling the corresponding product (alternatively, providing the corresponding service), a telephone number of the store, and the like. In this case, the letter string type multi-product discount coupon may be generated by at least one combination of numbers, letters, special letters, and symbols. Herein, the product item code corresponds to a product unique code (alternatively, service unique code) in the product information. Further, the experience information for the product/service may be experience information prepared by a terminal of a member pre-registered in the server 100, experience information prepared by a terminal purchasing the multi-product discount coupon associated with the corresponding product/service provided by the server 100, and the like.

Further, the server 100 issues the generated multi-product discount coupon to the purchase terminal 200.

In addition, the server 100 may previously set the quantity (alternatively, selling/payment price) of the multi-product discount coupon which may be purchased by one purchase terminal 200.

That is, the server 100 may be configured to purchase a multi-product discount coupon corresponding to a specific product and a specific service in one purchase terminal 200 within a predetermined selling quantity range (alternatively, selling/payment price range) (for example, within 100 coupons or within 20 million won).

As described above, the server 100 limits a large purchase for the specific product and service to prevent an illegal transaction.

Further, after performing the payment function is normally completed, the server 100 issues (alternatively, transmits), to the purchase terminal 200, a free discount coupon, a discount coupon, a gift card of a specific shopping mall, a gift card of a traditional market, and the like additionally provided with purchasing the multi-product discount coupon.

In addition, when the user receives a specific product and/or service in the store having the selling terminal 400 and thereafter, intends to use the multi-product discount coupon stored in the purchase terminal 200, the server 100 performs a use processing (alternatively, payment processing) function for the multi-product discount coupon stored in the purchase terminal 200 by interlocking among the purchase terminal 200, the payment server 300, and the purchase terminal 400.

Moreover, the server 100 processes (alternatively, switches/changes), into use completion state the corresponding multi-product discount coupon transmitted (alternatively, issued) to the purchase terminal 200.

Further, after performing the payment function is normally completed, when there is a balance of the corresponding multi-product discount coupon), the server 100 transmits, to the purchase terminal 200, a multi-product discount coupon including a usable price (alternatively, balance information), and the like. In this case, the usable price may be a price acquired by subtracting a payment price depending on the performing of the payment function from a just previously (alternatively, previous) usable price.

Further, after performing the payment function is normally completed, when there is the balance of the corresponding multi-product discount coupon), the server 100 may also transmit information including the usable price (alternatively, balance information), and the like to the purchase terminal 200 through the selling terminal 400.

In addition, after performing the payment function is normally completed, the server 100 transmits a predetermined point and/or discount coupon to the purchase terminal 200.

Moreover, after performing the payment function is normally completed, the server 100 may also transmit the predetermined point and/or discount coupon to the purchase terminal 200 through the selling terminal 400.

Besides, with the use of the multi-product discount coupon, charges may be distributed among the server 100, the payment server 300, and the selling terminal 400.

Further, the server 100 may verify (alternatively, generate) one or more recommendation information adjacent to a path on road guidance information generated by the purchase terminal 200 within a predetermined distance by interlocking with the purchase terminal 200. Herein, the recommendation information may be information on a store where the multi-product discount coupon is usable. In this caser, the server 100 may also generate the road guidance information based on the positional information of the purchase terminal 200 and the store information selected by the purchase terminal 200 by interlocking with the purchase terminal 200.

Further, the server 100 transmits the verified one or more recommendation information, the generated road guidance information, and the like to the purchase terminal 200.

Further, when the expiration date included in the multi-product discount coupon issued by the purchase terminal 200 reaches a predetermined date (including, for example, one month from the expiration date, 15 days from the expiration date, 7 days from the expiration date, 3 days from the expiration date, 1 day from the expiration date, and the like) and a usable price (alternatively, balance) remains in the corresponding multi-product discount coupon information, the server 300 transmits information including information indicating that the balance remains in the multi-product discount coupon, the expiration date, and the like to the purchase terminal 200.

In addition, the server 100 receives the experience information for the specific product/service, the evaluation information for the specific product/service, and the like transmitted from the purchase terminal 200.

Moreover, the server 100 stores the experience information for the received specific product/service, the evaluation information for the specific product/service, and the like, by interlocking (matching) with the corresponding product/service.

As described above, in respect to a specific product or a specific service corresponding to the at least one specific product and service information of which payment is completed, the server 100 may provide the corresponding specific product or specific service to the purchase terminal 200, according to delivery information (alternatively, delivery scheme) set (alternatively, designated) by the purchase terminal 200.

Further, the server 100 generates a clearance list for at least one specific product corresponding to the at least one specific product and service information of which the payment function is performed. Herein, the clearance list includes a product name, unique identification information of the product, a harmonized commodity description and coding system (HS) code, a delivery fee, a tax fare information (including a custom duty, an additional tax, a special consumption tax, a standard excess amount, an education tax, a special rural development tax, a liquor tax, and the like), and the like for the at least one specific product.

Further, the server 100 transmits the generated clearance list to the purchase terminal 200.

Further, the server 100 receives experience information, evaluation information, the identification information of the purchase terminal 200, and the like from a purchase to a reach (alternatively, coupon issuing) of the corresponding specific product or specific service, which are transmitted from the purchase terminal 200.

In addition, the server 100 stores the received experience information, evaluation information, and the like while matching the received experience information, evaluation information, and the like with the corresponding specific product or specific service.

The purchase terminal 200 communicates with the server 100, the payment server 300, the selling terminal 400, and the like.

Further, the purchase terminal 200 performs a member joining procedure for the user of the purchase terminal 200 by interlocking with the server 100.

In addition, when the purchase terminal 200 performs the member joining procedure, the purchase terminal 200 may normally complete the member joining procedure for the server 100 only by completing an authentication function through an own authentication means (including, for example, a mobile phone, a credit card, an ipin, and the like).

Further, when an application pre-installed in the purchase terminal 200 is executed, the purchase terminal 200 displays an application execution result screen. Herein, the application execution result screen includes a member information item (alternatively, menu/button) for transmitting the member information, a 3D panoramic image information item for searching and displaying the 3D panoramic image, a setting item for setting a function of the application, a may page item for managing the multi-product discount coupon purchased through the purchase terminal 200 or a travel destination list, and the like. In this case, the purchase terminal 200 communicates with the server 100 associated with the corresponding application in a background state.

Further, when the member information item is selected on the application execution result screen displayed in the purchase terminal 200, the purchase terminal 200 displays a member information screen for inputting (alternatively, receiving) the member information corresponding to the selected member information item.

In addition, the purchase terminal 200 receives member information depending on a user input (alternatively, user touch). Herein, the member information includes a name, an address, a used language, delivery destination information, travel destination information, a shopping object type (including, for example, an avatar type, an emoticon type, and the like), and the like.

Further, the purchase terminal 200 transmits the received member information, the identification information of the purchase terminal 200, and the like to the server 100. Herein, the identification information of the purchase terminal 200 includes a mobile directory number (MDN), a mobile IP, a mobile MAC, subscriber identification module (Sim) card unique information, a serial number, and the like.

Further, the purchase terminal 200 receives the 3D panoramic image information corresponding to the travel destination information in the member information transmitted from the server 100 in response to the transmitted member information. Herein, the 3D panoramic image information may be a state in which one or more codes corresponding to objects including the store, the POP, the leaflet, the banner advertisement, the board advertising, the billing, the sign, the price tag, and the like included in image information of an offline situation, respectively are added to the image information of the actual offline situation. Further, the object is defined while products and services provided in each store included in the image information of the corresponding offline situation are excluded. In addition, the codes corresponding to the objects are types such as a barcode, a QR code, and a letter string code, and include information on one or more products, information on one or more services, and the like, which are associated with the objects.

Further, the purchase terminal 200 displays the received 3D panoramic image information.

In addition, the purchase terminal 200 displays the 3D panoramic image information while moving the corresponding shopping object in the 3D panoramic image information according to the user input based on the shopping object type in the member information.

Further, after the member information is transmitted to the server, when the 3D panoramic image information item is selected on the application execution result screen displayed in the purchase terminal 200, the purchase terminal 200 may transmit current positional information of the purchase terminal 200 or the travel destination information to the server 100 and receive the 3D panoramic image information (including, for example, the 3D panoramic image information corresponding to the current positional information of the purchase terminal 200, the 3D panoramic image information corresponding to the travel destination information, and the like) transmitted from the server 100 in response to the current positional information of the purchase terminal 200 or the travel destination information which is transmitted and display the received 3D panoramic image information.

Further, when a specific code included in the 3D panoramic image information displayed in the purchase terminal 200 is selected, the purchase terminal 200 transmits the unique identification information of the selected specific code, the identification information of the purchase terminal 200, and the like to the server 100. In this case, when the product included in the 3D panoramic image information displayed in the purchase terminal 200 is selected, the purchase terminal 200 may not perform a particular function or display pre-stored product information corresponding to the selected product.

Further, the purchase terminal 200 receives one or more product and service information (alternatively, one or more product and service information corresponding to the unique identification information of the specific code) transmitted from the server 100 in response to the transmitted unique identification information of the specific code.

Further, the purchase terminal 300 displays the received one or more product and service information. In this case, the purchase terminal 200 may automatically arrange the one or more product and service information according to a predetermined reference (including, for example, the order of sales, the order of the prices, and the like) for the corresponding one or more product and service information and display the arranged product and service information.

As described above, according to the embodiment of the present invention, when the product included in the 3D panoramic image information is selected (alternatively, touched), the purchase terminal 200 and/or the server 100 recognizes the selected product and instead of a configuration in which the purchase terminal 200 displays the product information corresponding to the unique identification information of the recognized product, when the specific code in the 3D panoramic image information is selected while a predetermined code for the POP, the leaflet, the banner advertisement, the board advertising, the billing, the sign, the price tag, and the like associated with the information on the product, the purchase terminal 200 receives and displays one or more product and service information corresponding to the corresponding specific code provided from the server 100 to remove a recognition failure possibility depending on the selection of the product and provide more accurate information.

Further, the purchase terminal 200 transmits delivery information depending on the user input, the identification information of the purchase terminal 200, and the like the server 100. Herein, the delivery information represents a method (alternatively, means) for receiving a product or service paid by the corresponding purchase terminal 200 and includes a parcel service (including, for example, a parcel service through aviation, a ship, and the like), multi-product discount coupon issuing, spot receipt, and the like.

Further, the purchase terminal 200 performs the payment function by interlocking the server 100, the payment server 300, and the selling terminal 400 based on at least one specific product and service information selected among one or more product and service information displayed in the purchase terminal 200.

In this case, in respect to the specific product corresponding to the specific product and service information selected in the purchase terminal 200, when the corresponding specific product corresponds to a predetermined (alternatively, registered) import clearance impossible product (including, for example, meat, goods, weaponry, gas, drug, and the like), the purchase terminal 200 receives information (alternatively, payment function failure information) indicating that performing the payment function for the specific product and service information transmitted from the server 100 is impossible. Herein, the information indicating that performing the payment function is impossible includes information indicating that the specific product corresponding to the specific product and service information corresponds to the import clearance impossible product.

Further, the purchase terminal 200 displays the information indicating that performing the payment function for the received specific product and service information is impossible.

Further, when the specific product corresponding to the specific product and service information selected in the purchase terminal 200 does not correspond to the import clearance impossible product (including, for example, meat, goods, weaponry, gas, drug, and the like), the purchase terminal 200 performs the payment function for the payment price corresponding to the specific product and/or specific service corresponding to the specific product and service information by interlocking with the server 1100, the payment server 300, and the selling terminal 400. In this case, at the time of performing the payment function, the purchase terminal 200 applies a predetermined discount price to a cover price corresponding to the specific product and service information to perform a payment function for a price to which the discount price in the cover price. Further, the price to which the discount price is applied into the cover price may be a price which is equal to or lower than a lowest price in a corresponding country provided by a specific product or a specific service corresponding to the corresponding specific product and service information.

As described above, travelers may purchase a specific product and a specific service representing the corresponding area among a plurality of franchises at the same cost as or at lower cost than natives.

In addition, after performing the payment function is normally completed, the purchase terminal 200 receives the payment function performance result (alternatively, payment information) provided from the payment server 300. Herein, the payment function performance result (alternatively, payment information) includes product and service information, payment date and time information, price information for each ordered product/service, and the like.

Further, the purchase terminal 200 displays the received payment function performance result.

As described above, the purchase terminal 200 may search the product and/or service without actually visiting the offline store, purchase a usable traveler dedicated multi-product discount coupon by directly visiting the store at the travel destination with respect to the product and/service at the same cost as or lower cost than the natives, or receive the purchased product without visiting the store to enhance/extend a selection width of the product or the service depending on travel destination shopping or overseas direct purchase.

That is, in shopping the product and/or service by searching department stores or Dongdaemun shopping malls in Korea through the 3D panoramic image in foreign countries including China, U.S.A., one stop shopping including collection of shopping information of an offline store which is the same as an actual store, comparisons of prices of interested products, a purchase (alternatively, payment) function, and a delivery function may be performed to improve user convenience and perform a selling function as well as providing product information of products in small shops and traditional markets on streets without the online shopping mall through the present invention, thereby bringing about a turning point of a new revolution in an online electronic commerce industry.

Further, it is possible to reduce cost and time required to prepare excessive product design pages of the online shopping mall.

In addition, the purchase terminal 200 may receive the 3D panoramic image, the product and service information, and the like provided from the server 100 to which a used language is applied according to the corresponding used language.

Further, after performing the payment function is normally completed, the server 100 provides to the purchase terminal 200 a specific product or a specific service corresponding to the at least one paid specific product and service information.

That is, when the parcel service is included in the delivery information, the server 100 delivers a coupon corresponding to the specific product or the specific service corresponding to the at least one specific product and service information to the user of the purchase terminal 200 through delivery means including the aviation, the ship, a vehicle, and the like.

Further, when the spot receipt is included in the delivery information, the server 100 transmits to the purchase terminal 200 guidance information, identification code such as a bar code or a QR code type required for the spot receipt of the specific product or specific service together with the payment function performance result.

In addition, the purchase terminal 200 displays the guidance information, the identification code such as the barcode or the QR code, and the like which are required for the spot receipt of the received specific product or specific service.

Further, when the user of the purchase terminal 200 directly visits a store providing the corresponding specific product or specific service, the selling terminal 400 way authenticate (alternatively, recognizes) the identification code such as the bar code or QR code type stored in the purchase terminal 200 and thereafter, provide the specific product and specific service to the user of the purchase terminal 200.

Moreover, when the multi-product discount coupon issuing is included in the delivery information, the purchase terminal 200 receives the multi-product discount coupon corresponding to the specific product or specific service issued (alternatively, transmitted/provided) from the server 100. Herein, the multi-product discount coupon includes the cover price, the discount price, and an expiration date corresponding to the specific product and service information, a plurality of product and service item codes (alternatively, a plurality of product and service information associated with the specific product and service information/a plurality of product and service information in the same category as the specific product and service information) associated with the specific product and service information, a unique number (alternatively, a unique number of the multi-product discount coupon), and the like. Further, the multi-product discount coupon is a state in which a plurality of product and service item codes associated with the specific product and service information is grouped into one code and is generated as the bar code type, the QR code type, a letter string type, or the like. Further, each of the plurality of product and service information includes a product name (alternatively, service name), a product unique code (alternatively, service unique code), a product image (alternatively, service base image), product description information (alternatively, service description information), experience information of the product/service, evaluation information for the product/service, positional information of a store selling the corresponding product (alternatively, providing the corresponding service), a telephone number of the store, and the like. In this case, the letter string type multi-product discount coupon may be generated by at least one combination of numbers, letters, special letters, and symbols. Herein, the product item code corresponds to a product unique code (alternatively, service unique code) in the product information. Further, the experience information for the product/service may be experience information prepared by a terminal of a member pre-registered in the server 100, experience information prepared by a terminal purchasing the multi-product discount coupon associated with the corresponding product/service provided by the server 100, and the like.

Moreover, the purchase terminal 200 receives a free discount coupon, a discount coupon, a gift card of a specific shopping mall, a gift card of the traditional market, and the like which are additionally provided from the server 100 with the purchase of the multi-product discount coupon.

Further, the purchase terminal 200 stores and displays the received multi-product discount coupon.

Moreover, the purchase terminal 200 stores and displays the received free discount coupon, discount coupon, gift card of the specific shopping mall, gift card of the traditional market, and the like.

As described above, when the multi-product discount coupon issuing is included in the delivery information, the purchase terminal 200 may purchase the multi-product discount coupon within a predetermined selling quantity range (alternatively, selling/payment price range) (for example, within 100 coupons or within 20 million won) with respect to the multi-product discount coupon.

In addition, as described above, the quantity or price of the multi-product discount coupon which may be purchased by the purchase terminal 200 is limited to prevent illegal transaction.

Further, the purchase terminal 200 receives the clearance list transmitted from the server 100. Herein, the clearance list includes a product name, unique identification information of the product, an HS code, a delivery fee, a tax fare information (including a custom duty, an additional tax, a special consumption tax, a standard excess amount, an education tax, a special rural development tax, a liquor tax, and the like), and the like for the at least one specific product.

Further, the purchase terminal 200 displays the received clearance list.

In addition, the purchase terminal 200 transmits to the server 100 experience information, evaluation information, the identification information of the purchase terminal 200, and the like from a purchase to a reach (alternatively, coupon issuing) of the corresponding specific product or specific service with respect to the at least one specific product and service.

Further, when the current positional information of the purchase terminal 200 is positioned in an area (alternatively, an area in a specific country) where the multi-product discount coupon stored in the purchase terminal 200 may be used (alternatively, when the current positional information of the purchase terminal 200 is positioned in the area where the multi-product discount coupon stored in the purchase terminal 200 may be used within a travel period corresponding to travel period information which the purchase terminal 200 pre-registers in the server 100), the purchase terminal 200 displays information (alternatively, positional information of the store) on one or more stores where the multi-product discount coupon stored in the corresponding purchase terminal 200 may be used.

In this case, the purchase terminal 200 may include a GPS receiver (not illustrated). Herein, the GPS receiver receives a GPS signal transmitted from a satellite and generates position data of the purchase terminal 200 based on a longitude coordinate and a latitude coordinate included in the received GPS signal in real time. Herein, the generated position data is defined as a current position (alternatively, current position data) of the purchase terminal 200. Herein, the positional information may be received through the Wi-Fi or Wibro communication as well as the GPS receiver.

Further, the signal received through the GPS receiver may be configured to provide the positional information of the terminal to the purchase terminal 200 by using wireless communication schemes including 802.11 which is a standard of wireless networks for a wireless LAN proposed in Institute of Electrical and Electronics Engineers (IEEE) and a wireless LAN including some infrared communications, and the like, 802.15 which is a standard for a wireless personal area network (PAN) including Bluetooth, UWB, ZigBee, and the like, 802.16 which is a standard for a wireless metropolitan area network (MAN) including fixed wireless access (FWA), and the like and broadband wireless access (BWA), 802.20 which is a standard for mobile internet for mobile broadband wireless access (MBWA) including Wibro, WiMAX, and the like, and the like.

Further, when specific store information is selected among the information on one or more stores where the multi-product discount coupon stored in the corresponding purchase terminal 200 displayed in the purchase terminal 200 may be used, the purchase terminal 200 generates road guidance information up to a store corresponding to the corresponding specific store information from the current position of the purchase terminal 200 based on the current positional information of the purchase terminal 200 and the selected specific store information (alternatively, positional information of the specific store). In this case, the purchase terminal 200 may verify (alternatively, generate) one or more recommendation information adjacent to a path on the generated road guidance information within a predetermined distance by interlocking with the server 100. Herein, the recommendation information may be information on a store where the multi-product discount coupon is usable. In this case, the road guidance information may be generated in the form of the 3D panoramic image information by interlocking with the server 100.

Further, the purchase terminal 200 displays the generated road guidance information, the one or more generated recommendation information, and the like.

As described above, the purchase terminal 200 may provide the road guidance information to follow the corresponding avatar at the time of visiting the offline store by considering a moving line of the user of the purchase terminal 200 in virtual real by using the 3D panoramic image, the avatar (alternatively, emoticon), and the like to cause interest and improve user convenience.

In addition, when the user receives a specific product and/or service in the store having the selling terminal 400 and thereafter, intends to use the multi-product discount coupon stored in the purchase terminal 200, the purchase terminal 200 performs a use processing (alternatively, payment processing) function for the multi-product discount coupon stored in the purchase terminal 200 by interlocking among the server 100, the payment server 300, and the purchase terminal 400.

Further, the when the use processing for the multi-product discount coupon stored in the purchase terminal 200 is completed, the purchase terminal 200 discards the multi-product discount coupon stored in the purchase terminal 200 to be prevented from being doubly used (alternatively, reused).

In addition, after performing the payment function is normally completed, when there is the balance of the corresponding multi-product discount coupon, the purchase terminal 200 displays the multi-product discount coupon including a usable price (alternatively, balance information) transmitted from the server 100, and the like or outputs the multi-product discount coupon including the usable price (alternatively, balance information) transmitted from the server 100 as a printed matter such as a receipt provided from the selling terminal 400, and the like. In this case, the usable price may be a price acquired by subtracting a payment price depending on the performing of the payment function from a just previously (alternatively, previous) usable price.

Moreover, after performing the payment function is normally completed, the purchase terminal 200 may receive the predetermined point and/or discount coupon transmitted (alternatively, issued) from the selling terminal 400.

Further, the purchase terminal 200 displays or stores the received predetermined point and/or discount coupon.

Further, when the corresponding expiration date reaches a predetermined date (for example, one month from the expiration date, 15 days from the expiration date, 7 days from the expiration date, 3 days from the expiration date, 1 day from the expiration date, and the like) based on the expiration date included in the multi-product discount coupon and a usable price (alternatively, balance) remains in the corresponding multi-product discount coupon information, the purchase terminal 200 displays information including information indicating that the balance remains in the multi-product discount coupon, the expiration date, and the like every predetermined period. In this case, the information including information indicating that the balance remains in the multi-product discount coupon, the expiration date, and the like may be provided from the server 100.

In addition, the purchase terminal 200 receives the experience information for the specific product/service depending on the user input of the corresponding purchase terminal 200, the evaluation information for the specific product/service, and the like.

In this case, the purchase terminal 200 is configured to receive experience information, evaluation information, and the like within a predetermined number with respect to a specific product/service to prevent various experience information or evaluation information from being provided by the same user, thereby improving reliability for the corresponding experience information, the evaluation information, and the like.

Further, the purchase terminal 200 transmits the received experience information for the product/service, the received evaluation information for the product/service, the received identification information of the purchase terminal 200, and the like to the server 100.

The payment server 300 communicates with the server 100, the purchase terminal 200, the selling terminal 400, and the like.

Further, the payment server 300 performs the payment function for the specific product and service information selected by the purchase terminal 200 by interlocking with the purchase terminal 200, the server 100, the selling terminal 400, and the like. In this case, at the time of performing the payment function, the payment server 300 applies a predetermined discount price to a cover price corresponding to the specific product and service information to perform a payment function for a price to which the discount price in the cover price. Further, the price to which the discount price is applied into the cover price may be a price which is equal to or lower than a lowest price in a corresponding country provided by a specific product or a specific service corresponding to the corresponding specific product and service information.

In addition, after performing the payment function is normally completed, the payment server 300 provides a payment function performance result (alternatively, payment information) to the purchase terminal 200. Herein, the payment function performance result (alternatively, payment information) includes product and service information, payment date and time information, price information for each ordered product/service, and the like.

In addition, when the user receives a specific product and/or service in the store having the selling terminal 400 and thereafter, intends to use the multi-product discount coupon stored in the purchase terminal 200, the payment server 300 performs a use processing (alternatively, payment processing) function for the multi-product discount coupon stored in the purchase terminal 200 by interlocking among the purchase terminal 200, the server 100, and the purchase terminal 400.

Herein, the selling terminal 400 may be a point of sales (POS) terminal provided in a store, and the like.

Further, the selling terminal 400 is provided (alternatively, installed) in any store.

Further, the selling terminal 400 performs a member joining procedure for the user of the selling terminal 400 by interlocking with the server 100.

In addition, at the time of performing the member joining procedure, the selling terminal 400 may normally complete the member joining procedure for the server 100 only by completing an authentication function through an own authentication means (including, for example, a mobile phone, a credit card, an ipin, and the like).

Further, the selling terminal 400 communicates with the server 100, the purchase terminal 200, the payment server 300, and the like.

Moreover, the selling terminal 400 performs the payment function for the specific product and service information selected by the purchase terminal 200 by interlocking with the purchase terminal 200, the server 100, the payment server 300, and the like.

Further, selling terminal 400 receives the payment function performance result (alternatively, payment information) depending on the performance of the payment function transmitted the server 100 or the payment server 300, the selling quantity of multi-product discount coupons issued from the server 100, and the like.

In addition, the selling terminal 400 may perform a product inventory management function in a store associated with the selling terminal 400 based on the received payment function performing result, the selling quantity of multi-product discount coupons, and the like.

Further, the selling terminal 400 may perform a marketing function for the product or service provided by the store associated with the corresponding selling terminal 400 by applying custom relation management (CRM) marketing based on the received payment function performing result, the selling quantity of multi-product discount coupons, and the like.

As described above, it is possible to count travelers which visit the corresponding area positioned in the store associated with the selling terminal 400 during a short period only by product or service selling itself without a separate leaflet promotion or marketing activity, and it is possible to determine anticipated sales and the number of visit scheduled travelers through multi-product discount coupons which are sold in advance, thereby allowing the secure of inventory, manpower arrangement, and the like and thus improving management efficiency.

Further, as described above, advertisement and promotion design pages which are excessively consumed during online selling are substituted with the 3D panoramic image, and as a result, the selling terminal 400 may significantly reduce excessive advertisement cost, thereby saving cost.

In addition, when the user receives a specific product and/or service in the store 400 having the selling terminal 400 and thereafter, intends to use the multi-product discount coupon stored in the purchase terminal 200, the selling terminal 400 recognizes the multi-product discount coupon (alternatively, unique number of the corresponding multi-product discount coupon) stored in the purchase terminal 200 in the barcode type, the QR code type, and the like.

That is, when the user of the purchase terminal 200 having the multi-product discount coupon intends to purchase one or more products sold in the corresponding store by visiting the store having the selling terminal 400 perform the payment function through the corresponding multi-product discount coupon in order to pay a reward for the corresponding service after receiving the service provided in the corresponding store, the selling terminal 400 recognizes the unique number (alternatively, information on the corresponding multi-product discount coupon) of the multi-product discount coupon stored in (alternatively, issued from) the purchase terminal 200. In this case, the selling terminal 400 may recognize the corresponding multi-product discount coupon through a recognition unit (including, for example, a barcode recognizing unit, a QR code recognizing unit, and the like) provided in the corresponding selling terminal 400.

Further, the selling terminal 400 performs the use processing (alternatively, payment processing) function for the multi-product discount coupon stored in the purchase terminal 200 by interlocking among the purchase terminal 200, the server 100, and the payment server 300 based on the recognized multi-product discount coupon (alternatively, the unique number of the multi-product discount coupon).

Moreover, the selling terminal 400 processes (alternatively, switches/changes) in use completion state the corresponding multi-product discount coupon transmitted (alternatively, issued) to the purchase terminal 200.

Further, after the use processing (alternatively, payment function performing) for the corresponding multi-product discount coupon is completed, the selling terminal 400 displays a use processing result for the corresponding multi-product discount coupon. Herein, the use processing result for the multi-product discount coupon includes a store name, a store position, a store contact, product and service information, payment date and time information, price information for each ordered product/service, and the like.

Further, after the use processing (alternatively, payment function performing) for the corresponding multi-product discount coupon is completed, the selling terminal 400 displays a use processing result for the corresponding multi-product discount coupon as the printed matter such as the receipt.

In addition, after the use processing (alternatively, payment function performing) for the corresponding multi-product discount coupon is completed, when there is the balance of the corresponding multi-product discount coupon, the selling terminal 400 receives information including the usable price (alternatively, balance information/updated usable price) in the corresponding multi-product discount coupon transmitted from the server 100.

Further, the selling terminal 400 displays the information including the usable price in the corresponding received multi-product discount coupon or outputs the information as the printed matter such as the receipt.

Moreover, after the use processing (alternatively, payment function performing) for the corresponding multi-product discount coupon is completed, the selling terminal 400 transmits (alternatively, issues) a predetermined point and/or discount coupon to the purchase terminal 200. Herein, the point and/or discount coupon may be included together with the use processing result for the multi-product discount coupon or included in the issued receipt.

As described above, the tag associated with the corresponding product or store is included in the 3D panoramic image for the product displayed in the store or the store on the road view for the street to implement virtual reality.

Further, as described above, when the tag associated with the product or store is selected in the 3D panoramic image including the tag associated with the product or store, information on the product or store associated with the selected tag may be provided and a payment function of a traveler dedicated prepaid multi-product discount coupon corresponding to information on a specific product or store among the provided product or store information may be performed.

Hereinafter, a control method of the travel destination one stop shopping system based on the 3D panoramic image according to the present invention will be described in detail with reference to FIGS. 1 to 15.

Figure 8:
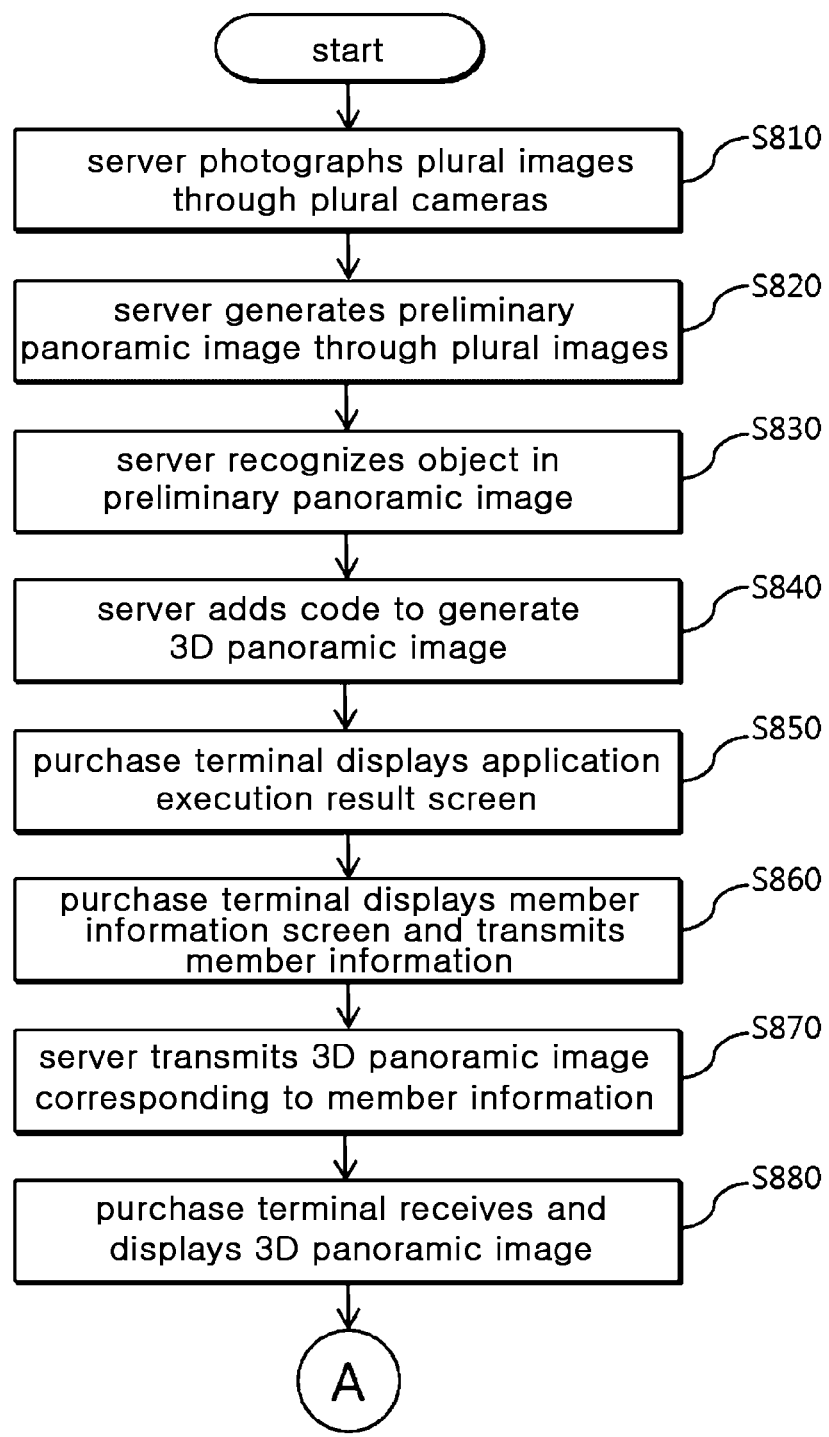
FIGS. 8 and 9 are flowchart illustrating a control method of a travel destination one stop shopping system based on a 3D panoramic image according to an embodiment of the present invention.
Figure 9:
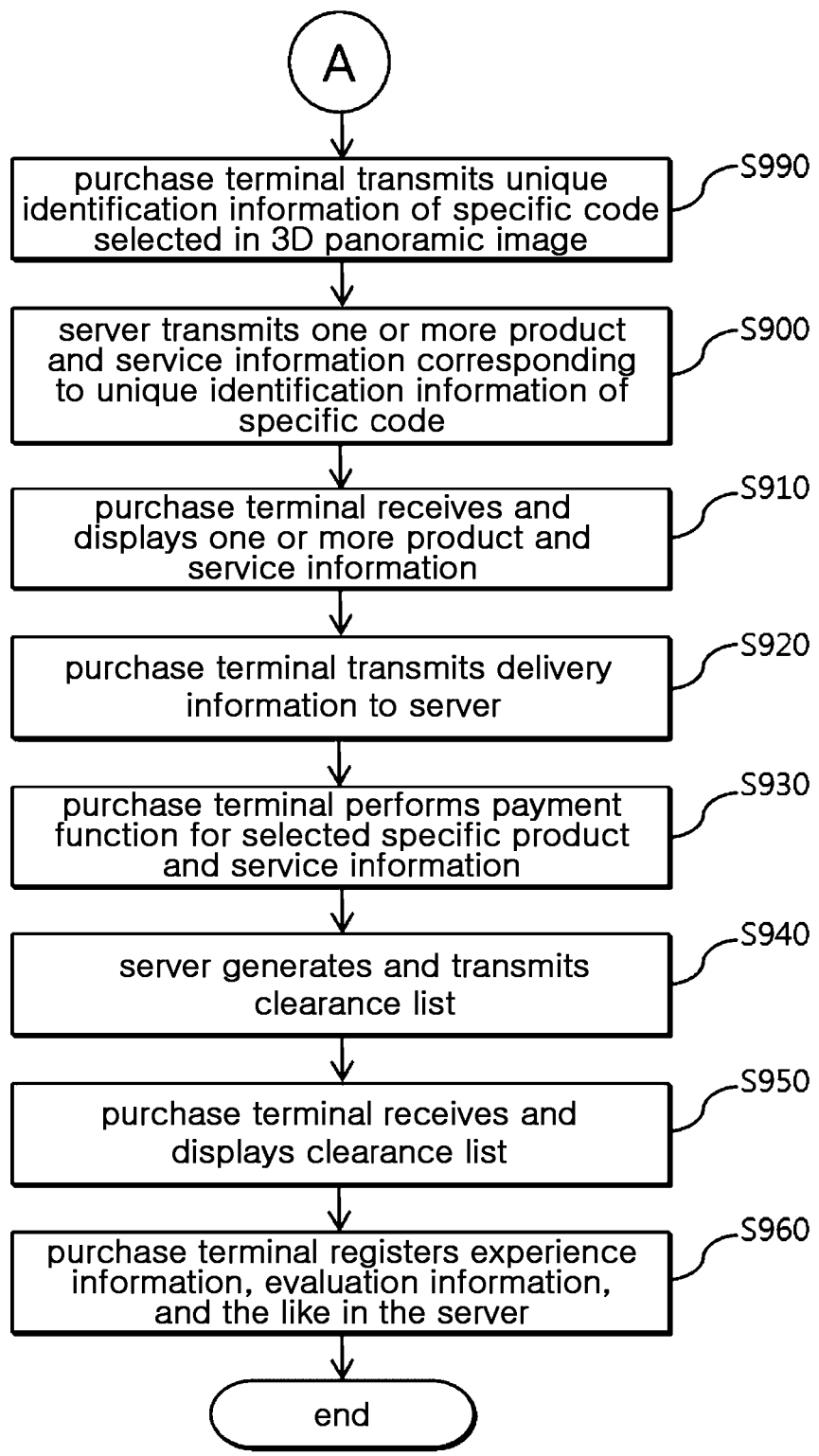

FIGS. 8 and 9 are flowchart illustrating a control method of a travel destination one stop shopping system based on a 3D panoramic image according to an embodiment of the present invention.

First, a server 100 photographs a first image and a second image including one or more offline stores, products within the corresponding stores, POPs, leaflets, banner advertisements, board advertising, billing, signs, price tags, and the like through a plurality of camera (not illustrated) included in the server 100. Herein, the stores include department stores, shopping malls, outlets, restaurants, hospitals, buildings (alternatively, constructions), and the like.

As an example, the server 100 photographs an 11-th image and a 12-th image including a plurality of products in a large shopping mall through an 11-th camera and a 12-th camera, respectively.

As another example, the server 100 photographs a 21-th image and a 22-th image including a plurality of offline stores a 21-th camera and a 22-th camera, respectively.

Thereafter, the server 100 acquires an overlapping area in which the first image and the second image overlap with each other based on the orientation of pixels with respect to the photographed first and second images.

Further, the server 100 generates a preliminary panoramic image by synthesizing the first image and the second image based on the acquired overlapping area. In this case, the server 100 may generate the preliminary panoramic image by synthesizing the photographed first and second images by various known synthesizing methods.

As an example, the server 100 generates a first preliminary panoramic image by synthesizing the 11-th image and the 12-th image based on the overlapping area in which the photographed 11-th and 12-th images overlap with each other.

As another example, the server 100 generates a second preliminary panoramic image by synthesizing the 21-th image and the 22-th image based on the overlapping area in which the photographed 21-th and 22-th images overlap with each other (S820).

Thereafter, the server 100 recognizes one or more objects included in the preliminary panoramic image, respectively. Herein, the objects may also be respective stores positioned on the offline and include POPs, leaflets, banner advertisements, board advertising, billing, signs, price tags, and the like which are positioned on the offline or positioned within the respective stores. In this case, the objects in the present invention may be a state except for products and services provided in the stores.

That is, the server 100 recognizes one or more stores included in the preliminary panoramic image, respectively, or recognizes POPs, leaflets, banner advertisements, board advertising, billing, signs, price tags, and the like included in the preliminary panoramic image, respectively.

As an example, the server 100 recognizes a first POP, a second POP, a first price tag, a second price tag, a third price tag, and a fourth price tag included in the first preliminary panoramic image, respectively.

As another example, the server 100 recognizes a plurality of stores (for example, a first physician, a first pharmacy, a first convenience store, a first car, a first plastic surgery, a second plastic surgery, a second pharmacy, a first orthopedic surgery, a second convenience store, and the like on the offline) included in the second preliminary panoramic image, respectively (S830).

Thereafter, the server 100 generates a 3D panoramic image by adding (alternatively, inserting) codes corresponding to one or more recognized objects into a partial area on the corresponding object in the preliminary panoramic image or adding (alternatively, inserting) the codes to be adjacent to the object. Herein, the codes have forms including a barcode, a QR code, a letter string code, and the like and include information on one or more products, information on one or more services, and the like which are associated with the recognized object. Further, the letter string code may be constituted in combination of language-specific letters, numbers, symbols, and the like. In this case, the product information includes product names, product-specific codes, product images, product description information, experience information on products, evaluation information on products, positional information of stores that sell the corresponding products, phone numbers of the stores, and the like. Further, the service information includes service names, service-specific codes, service basic images, service description information, experience information on services, evaluation information on services, positional information of stores that provide the corresponding services, phone numbers of the stores, and the like.

Further, the server 100 may also generate the 3D panoramic image for each language by considering a language-specific characteristic.

As an example, the server 100 generates a first 3D panoramic image by adjacently adding a first barcode including information on the plurality of products corresponding to the recognized first POP, a second barcode including another information on the plurality of products corresponding to the recognized second POP, a third barcode including product information on an apple which is a product corresponding to the recognized first price tag, a fourth barcode including product information on an oriental melon which is a product corresponding to the recognized second price tag, a fifth barcode including product information on a watermelon which is a product corresponding to the recognized third price tag, and a sixth barcode including product information on a graph which is a product corresponding to the recognized fourth price tag into the first POP, the second POP, the first price tag, the second price tag, the third price tag, and the fourth price tag, respectively, As another example, the server 100 generates a second 3D panoramic image by adding a first QR code including service information on a plurality of services provided by the recognized first physician, a second QR code including service information on a plurality of services provided by the recognized first pharmacy, a third QR code including product and service information on a plurality of products and services provided by the recognized first convenience store, a fourth QR code including product information on a plurality of cars provided by the recognized first car, a fifth QR code including service information on a plurality of services provided by the recognized first plastic surgery, a sixth QR code including service information on a plurality of services provided by the recognized second plastic surgery, a seventh QR code including service information on a plurality of services provided by the recognized second pharmacy, an eighth QR code including service information on a plurality of services provided by the recognized first orthopedic surgery, and a ninth QR code including service information on a plurality of services provided by the recognized second convenience store into the first physician, the first pharmacy, the first convenience store, the first car, the first plastic surgery, the second plastic surgery, the second pharmacy, the first orthopedic surgery, and the second convenience store, respectively (S840).

Thereafter, when a pre-installed application is executed on the purchase terminal 200, the purchase terminal 200 displays an application, execution result screen. Herein, the application execution result screen includes a member information item (alternatively, a menu/a button) for transmitting member information, a 3D panoramic image information item for retrieving and displaying the 3D panorama image, a setting item for setting functions of the application, a my-page item for managing multi-product discount coupons, travel destination lists, and the like which are purchased by the purchase terminal 200, and the like. In this case, the purchase terminal 200 communicates with the server 100 associated with the corresponding application in a background state.

Figure 10:
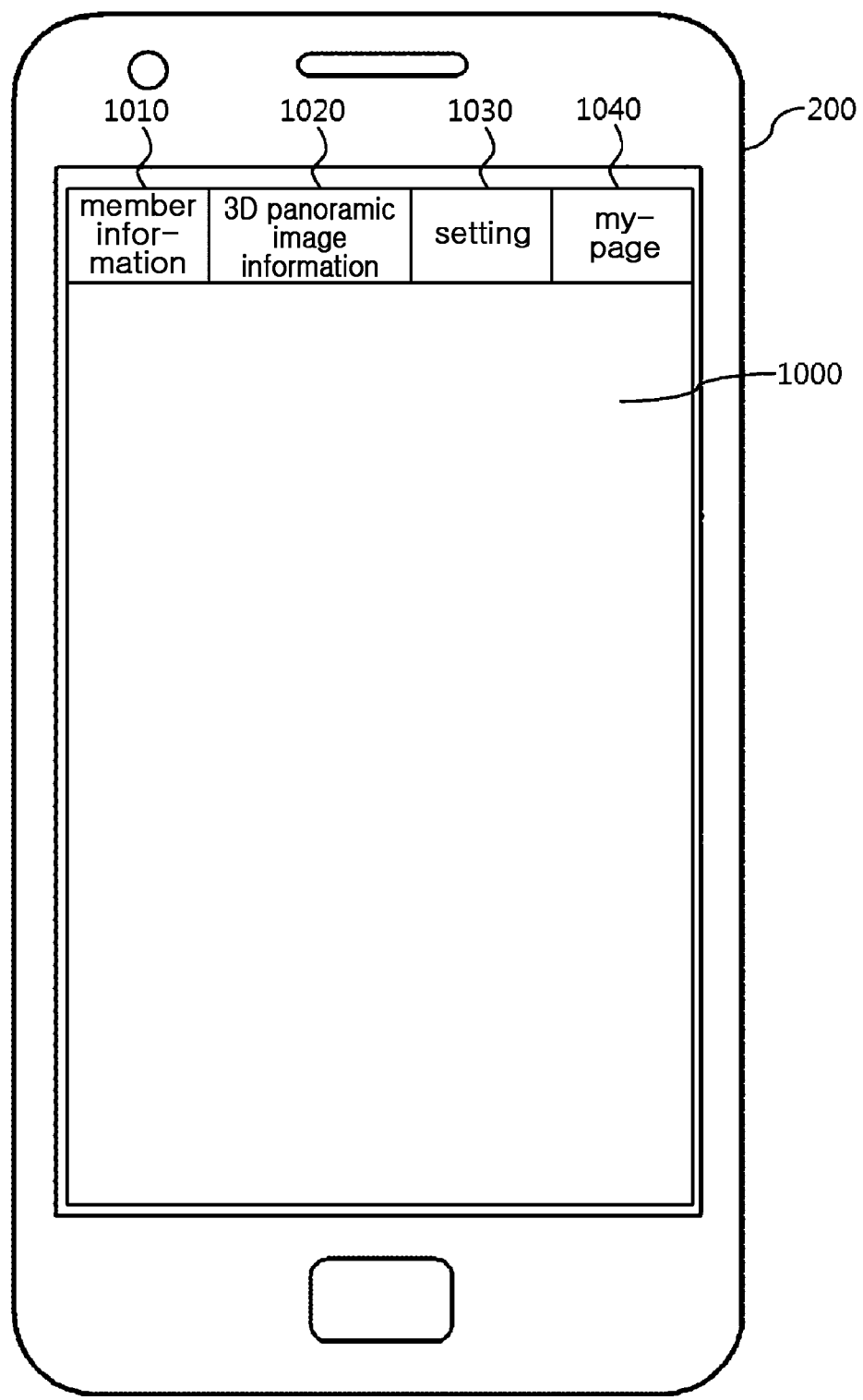
FIGS. 10 to 15 illustrate are diagrams illustrating a screen of a purchase terminal according to an embodiment of the present invention.

As an example, as illustrated in FIG. 10, when a travel destination shopping information application pre-installed in the purchase terminal 200 is executed, the purchase terminal 200 displays a travel destination shopping information screen 1000 and communicates with the server 100 associated with the travel destination shopping information application in the background state. Herein, the travel destination shopping information screen 1000 includes a member information item 1010, a 3D panoramic image information item 1020, a setting item 1030, a my-page item 1040, and the like (S850).

Thereafter, when the member information item is selected from the application execution result screen displayed on the purchase terminal 200, the purchase terminal 200 displays a member information screen for receiving the member information corresponding to the selected member information item.

Further, the purchase terminal 200 receives the member information according to a user input (alternatively, a user touch). Herein, the member information includes names, addresses, used languages, destination information, travel destination information, shopping object types (for example, including avatar types, emoticon types, and the like), and the like.

Further, the purchase terminal 200 transmits the received member information, identification information of the purchase terminal 200, and the like to the server 100. Herein, the identification information of the purchase terminal 200 includes an MDN, a mobile IP, a mobile MAC, subscriber identity module (Sim) card unique information, a serial number, and the like.

Figure 11:
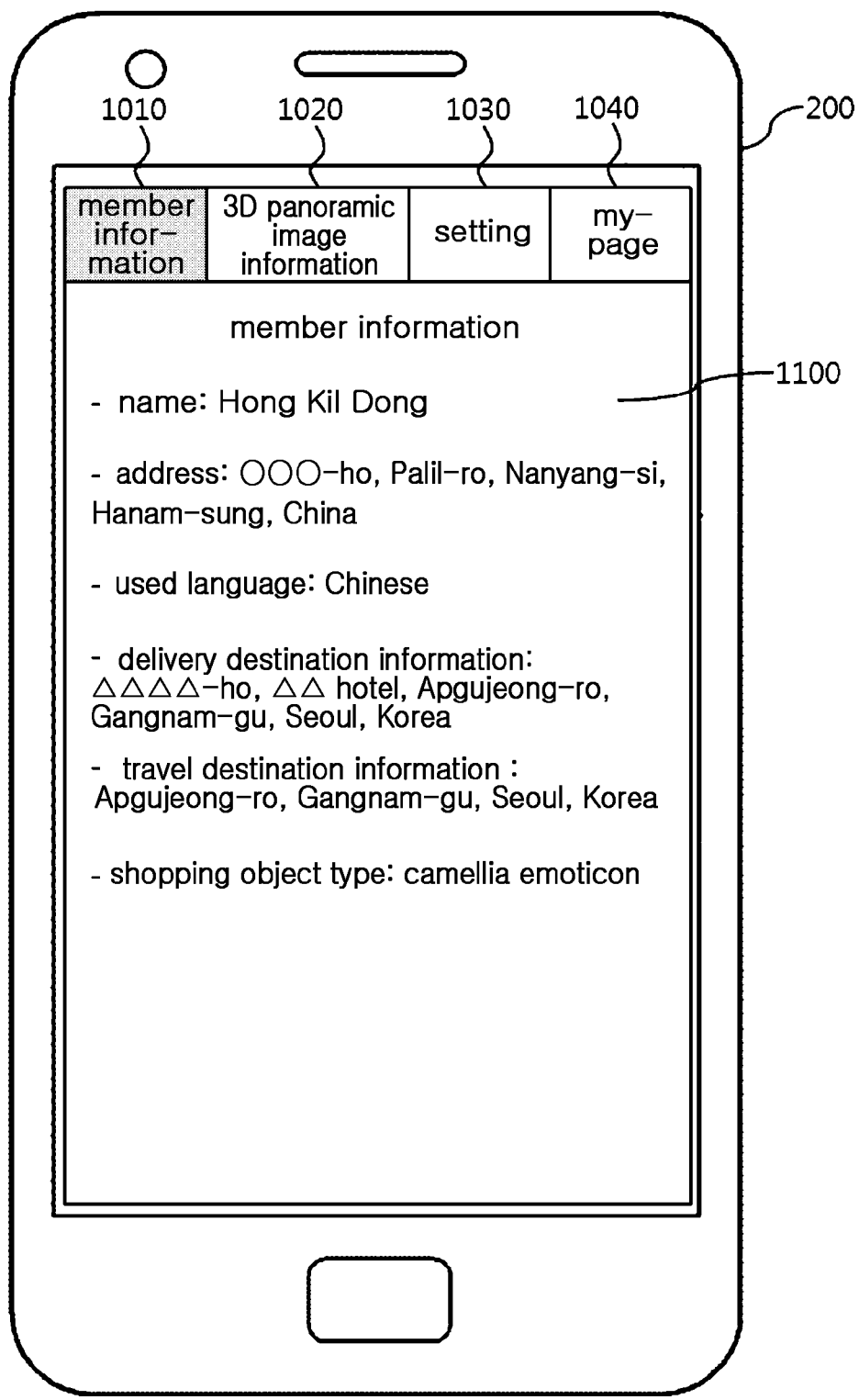

As an example, when the member information item 1010 is selected from the travel destination shopping information screen 1000 illustrated in FIG. 10, as illustrated in FIG. 11, the purchase terminal 200 displays the member information screen 1100 corresponding to the selected member information item 1010.

Further, when the purchase terminal 200 receives member information including a name (for example, Hong Kil Dong), an address (for example, 123, Palil-ro, Nanyang-si, Hanam-sung, China), a used language (for example, Chinese), delivery destination information (for example, 123, AB hotel, Apgujeong-ro, Gangnam-gu, Seoul, Korea to stay during the travel), travel destination information (for example, Apgujeong-ro, Gangnam-gu, Seoul, Korea), a shopping object type (for example, a camellia emoticon), and the like, according to the user input on the member information screen 1100 illustrated in FIG. 11, the purchase terminal 200 transmits the received member information, the identification information on the purchase terminal 200, and the like to the server 100 (S860).

Thereafter, the server 100 receives the member information transmitted from the purchase terminal 200, the identification information of the purchase terminal 200, and the like.

Further, the server 100 transmits the 3D panoramic image information corresponding to the travel destination information included in the member information to the purchase terminal 200 based on the received member information. In this case, the server 100 may transmit the 3D panoramic image information prepared by the corresponding used language to the purchase terminal 200 based on the used language in the member information.

As an example, the server 100 transmits the 3D panoramic image information corresponding to the travel destination information and Chinese to the purchase terminal 200 based on the travel destination information (for example, Apgujeong-ro, Gangnam-gu, Seoul, Korea) and the used language (for example, Chinese) included in the member information transmitted from the purchase terminal 200 (S870).

Thereafter, the purchase terminal 200 receives the 3D panoramic image information corresponding to the travel destination information in the member information transmitted from the server 100 in response to the transmitted member information. Herein, the 3D panoramic image information may be a state in which one or more codes corresponding to objects including stores, POPs, leaflets, banner advertisements, board advertising, billing, signs, price tags, and the like included in image information in the offline situation are added into the image information in an actual offline situation. Further, the object is defined as a state except for a product and a service provided in each store included in the image information in the corresponding offline situation. Further, the code corresponding to the object has a form including a barcode, a QR code, a letter string code, and the like, and include information on one or more goods, information on one or more services, and the like which are associated with the object.

Further, the purchase terminal 200 displays the received 3D panoramic image information.

Further, the purchase terminal 200 displays the 3D panoramic image information while moving the corresponding shopping object in the 3D panoramic image information according to a user input based on the shopping object type in the member information.

Figure 12:
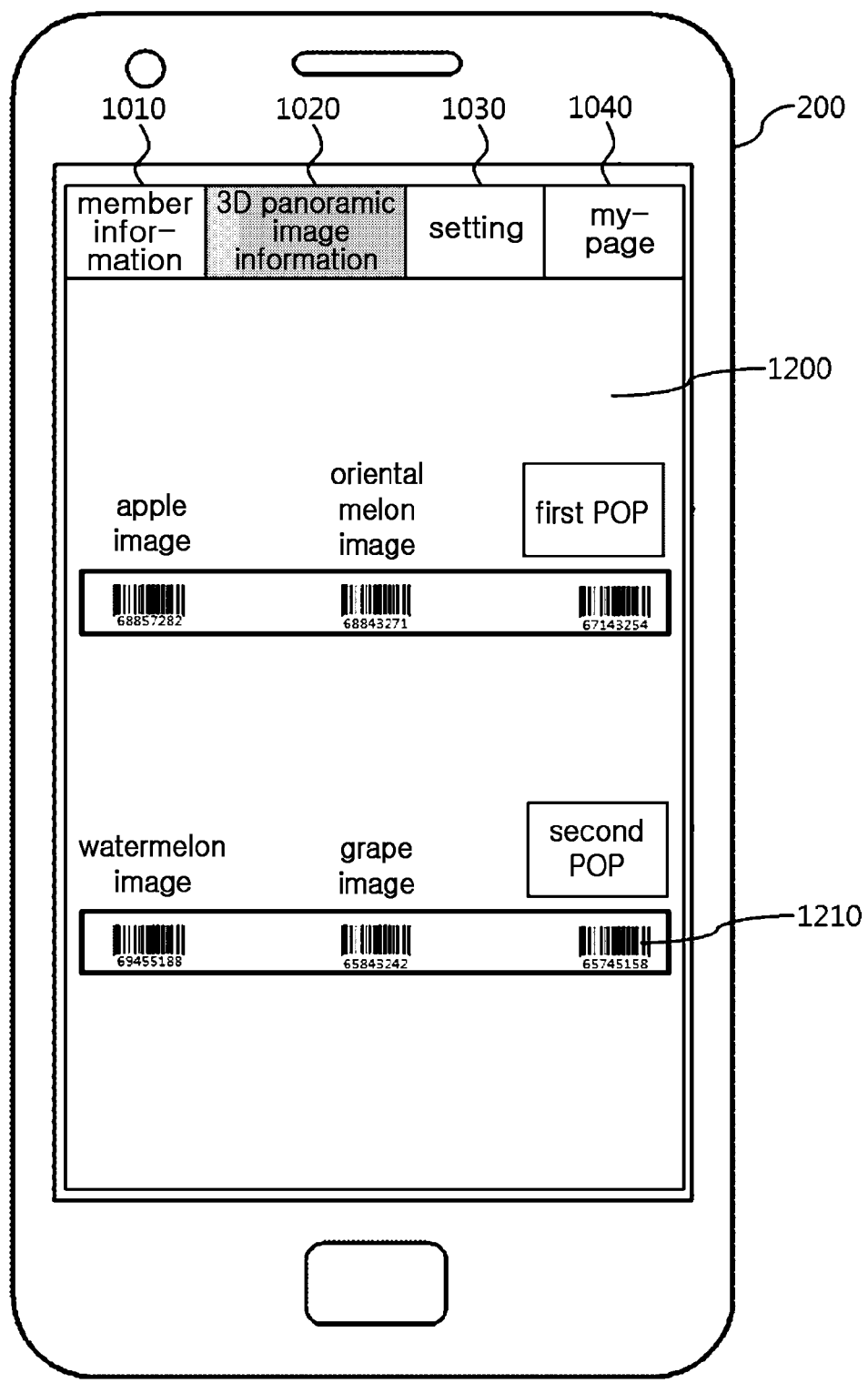

As an example, as illustrated in FIG. 12, the purchase terminal 200 displays the first 3D panoramic image information 1200 corresponding to the travel destination information (for example, Apgujeong-ro, Gangnam-gu, Seoul, Korea) transmitted from the server 100 in response to the transmitted member information. Herein, the first 3D panoramic image information 1200 may be 3D panoramic image information of a food court in the department store near to the travel destination information.

Figure 13:
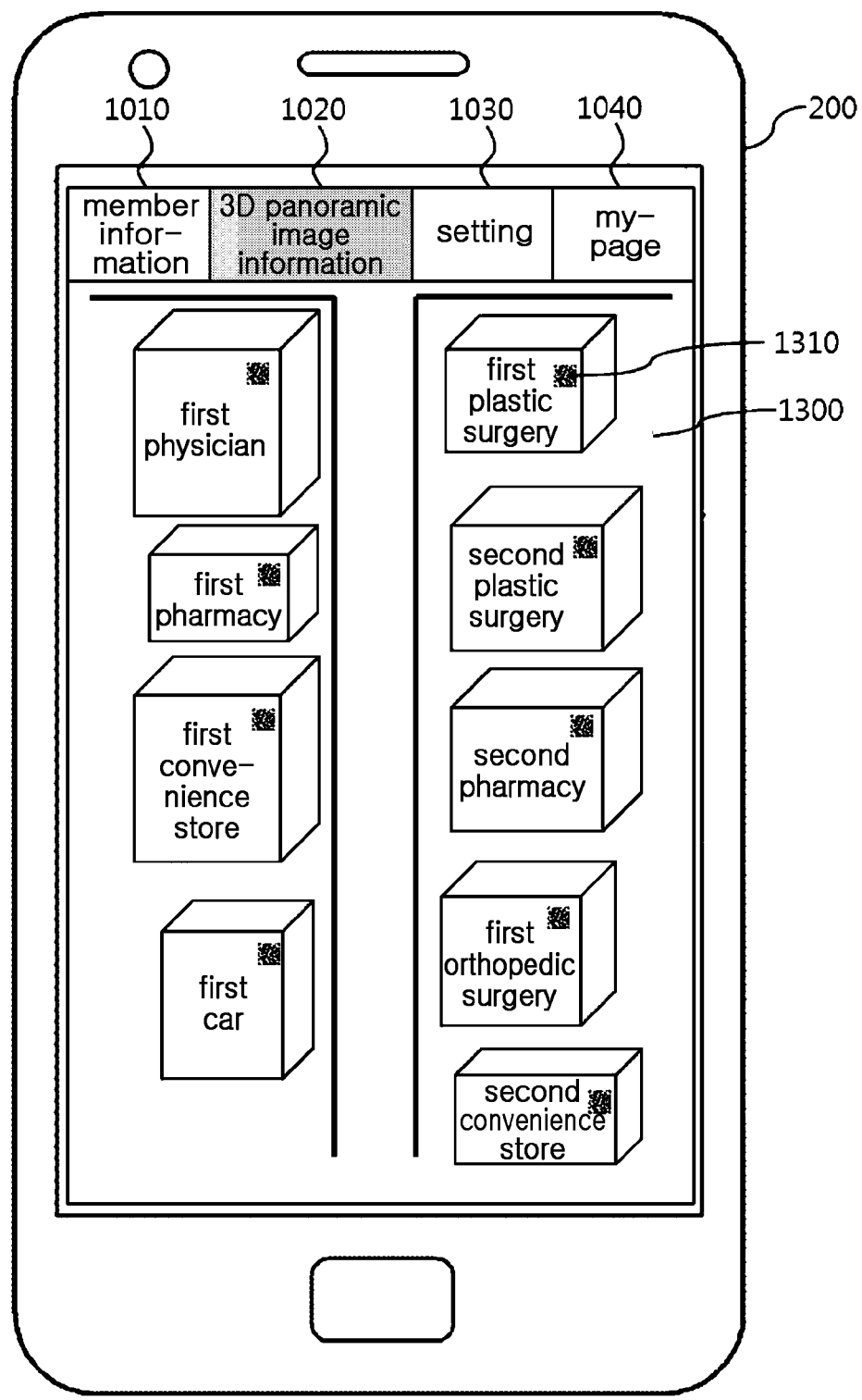

As another example, as illustrated in FIG. 13, the purchase terminal 200 displays the second 3D panoramic image information 1300 corresponding to the travel destination information (for example, Apgujeong-ro, Gangnam-gu, Seoul, Korea) transmitted from the server 100 in response to the transmitted member information. Herein, the second 3D panoramic image information 1300 may be road view image information on the travel destination information.

Further, after transmitting the member information to the server, when the 3D panoramic image information item is selected from the application execution result screen displayed on the purchase terminal 200, the purchase terminal 200 may transmit current positional information of the purchase terminal 200, the travel destination information, or the like to the server 100, receive the 3D panoramic image information (for example, including 3D panoramic image information corresponding to the current positional information of the purchase terminal 200, 3D panoramic image information corresponding to the travel destination information, and the like) transmitted from the server 100 in response to the transmitted current positional information of the purchase terminal 200 or the travel destination information, and display the received 3D panoramic image information (S880).

Thereafter, when a specific code included in the 3D panoramic image information displayed on the purchase terminal 200 is selected, the purchase terminal 200 transmits unique identification information on the selected specific code, identification information on the purchase terminal 200, and the like to the server 100. In this case, when a product included in the 3D panoramic image information displayed on the purchase terminal 200 is selected, the purchase terminal 200 may not perform a specific function or display pre-stored product information corresponding to the selected product.

As an example, when a second barcode 1210 included in the first 3D panoramic image information 1200 illustrated in FIG. 12 is selected, the purchase terminal 200 transmits unique identification information on the selected second barcode 1210, identification information on the purchase terminal 200, and the like to the server 100.

As another example, when a fifth QR code 1310 included in the second 3D panoramic image information 1300 illustrated in FIG. 13 is selected, the purchase terminal 200 transmits unique identification information on the selected fifth QR code 1310, identification information on the purchase terminal 200, and the like to the server 100 (S890).

Thereafter, the server 100 receives the unique identification information on the specific code transmitted from the purchase terminal 200, the identification information of the purchase terminal 200, and the like.

Further, the server 100 verifies information on one or more products and services corresponding to the received unique identification information on the specific code in the product and service information per the pre-stored code. Herein, the product and service information includes a product name (alternatively, a service name), a product-specific code (alternatively, a service-specific code), a product image (alternatively, a service basic image), product description information (alternatively, service description information), experience information about the product/service, evaluation information about the product/service, and the like.

Further, the server 100 transmits the verified information on one or more products and services (alternatively, the information on one or more products and services corresponding to the unique identification information on the specific code) to the purchase terminal 200.

For example, the server 100 transmits to the purchase terminal 200 51-th product information to 55-th product information associated with the second barcode transmitted from the purchase terminal 200 in the product and service information per the pre-stored code. Herein, the 51-th product information to the 55-th product information may be product information associated with red ginseng.

As another example, the server 100 transmits multiple service information (alternatively, medical subject, information) on a plurality of services provided in the corresponding first plastic surgery to the purchase terminal 200 in relation with the fifth QR code transmitted from the purchase terminal 200 in the product and service information per the pre-stored code (S900).

Thereafter, the purchase terminal 200 receives the information on one or more products and services (alternatively, the information on one or more products and services corresponding to the unique identification information on the specific code) transmitted from the server 100 in response to the transmitted unique identification information on the specific code.

Further, the purchase terminal 200 displays the received information on one or more products and services. In this case, the purchase terminal 200 automatically arranges the information on one or more products and services according to a predetermined reference (for example, including a sale order, a price order, and the like) with respect to the corresponding information on one or more products and services and may also display the arranged product and service information.

As an example, as illustrated in FIG, 14, the purchase terminal 200 displays the 51-th product information to 55-th product information 1400 which is the product information associated with red ginseng transmitted from the server 100 in response to the transmitted unique identification information of the second barcode.

Figure 15:
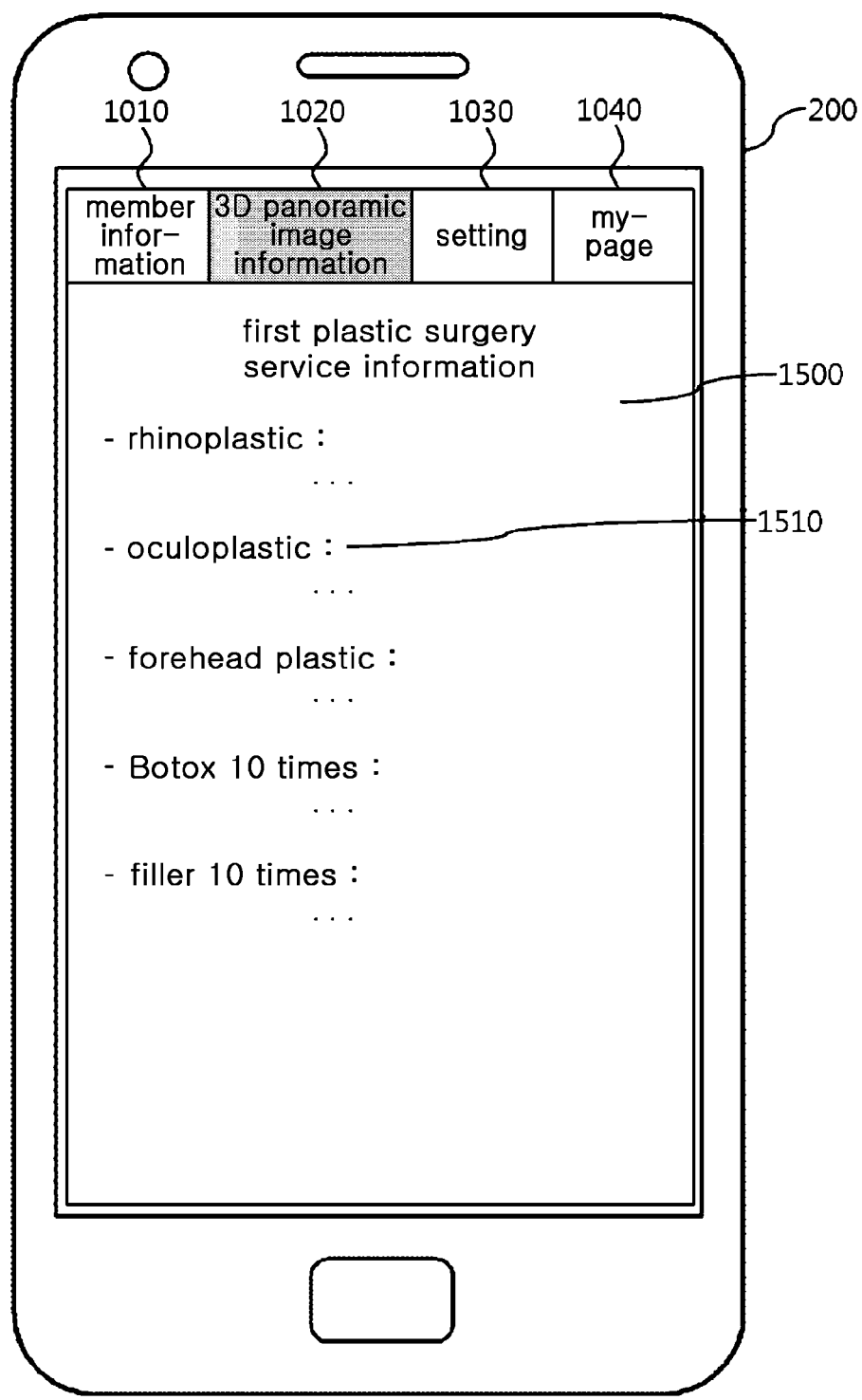

As another example, as illustrated in FIG. 15, the purchase terminal 200 displays multiple service information 1500 (alternatively, medical subject information) provided by the corresponding first plastic surgery transmitted from the server 100 in response to the transmitted unique identification information of the fifth QR code (S910).

Thereafter, the purchase terminal 200 transmits delivery information, the identification information on the purchase terminal 200, and the like to the server 100 according to the user input. Herein, the delivery information represents methods (alternatively, means) for receiving products or services paid in the corresponding purchase terminal 200 and includes parcel delivery services (for example, including parcel delivery services through aircrafts, ships, and the like), issuance of multi-product discount coupons, site reception, and the like.

Further, the server 100 receives and stores the delivery information, the identification information of the purchase terminal 200, and the like which are transmitted from the purchase terminal 200.

As an example, the purchase terminal 200 transmits second delivery information including aircraft parcel delivery services, the identification information on the purchase terminal 200, and the like to the server 100 according to the user input.

As another example, the purchase terminal 200 transmits first delivery information including issuance of multi-product discount coupons, the identification information on the purchase terminal 200, and the like to the server 100 according to the user input (S920).

Thereafter, the purchase terminal 200 performs a payment function by interlocking with the server 100, the payment server 300, the selling terminal 400, and the like on the basis of information on at least one specific product and service selected from the information on one or more products and services displayed on the purchase terminal 200.

In this case, with respect to a specific product corresponding to the information on the specific product and service selected in the purchase terminal 200, when the corresponding specific product corresponds to predetermined (alternatively, registered) import clearance-impossible products (for example, including meats, goods, weapons, gas, drugs, and the like), the server 100 transmits information (alternatively, payment function failure information) representing that performance of the payment function for the information on the specific product and service is impossible to the purchase terminal 200. Herein, the information representing that the performance of the payment function is impossible includes information representing that the specific product corresponding to the information on the specific product and service corresponds to the import clearance-impossible product, and the like.

Further, the purchase terminal 200 receives the information representing that the performance of the payment function for the information on the specific product and service is impossible which is transmitted from the server 100 and displays the information representing that the performance of the payment function for the received information on the specific product and service is impossible.

Further, when the specific product corresponding to the information on the specific product and service selected in the purchase terminal 200 does not correspond to the predetermined (alternatively, registered) import clearance-impossible product (for example, including meats, goods, weapons, gas, drugs, and the like), the server 100 performs the payment function for a price to which a discount price is applied in a cover price by applying the predetermined discount price to the cover price corresponding to the information on at least one specific product and service. Further, the price to which the discount price is applied in the cover price may be a price which is equal to or lower than a minimum price in the corresponding country to which a specific product or a specific service corresponding to the corresponding information on the specific product and service is provided.

Further, after the payment function is normally completed, the server 100 (alternatively, the payment server 300) provides a payment function performance result (alternatively, payment information) to the purchase terminal 200. Herein, the payment function performance result (alternatively, the payment information) includes information on at least one product and service, payment date and time information, price information per ordered product/service, and the like.

Further, the purchase terminal 200 receives the payment function performance result transmitted from the server 100 (alternatively, the payment server 300) and displays the received payment function performance result.

Figure 14:
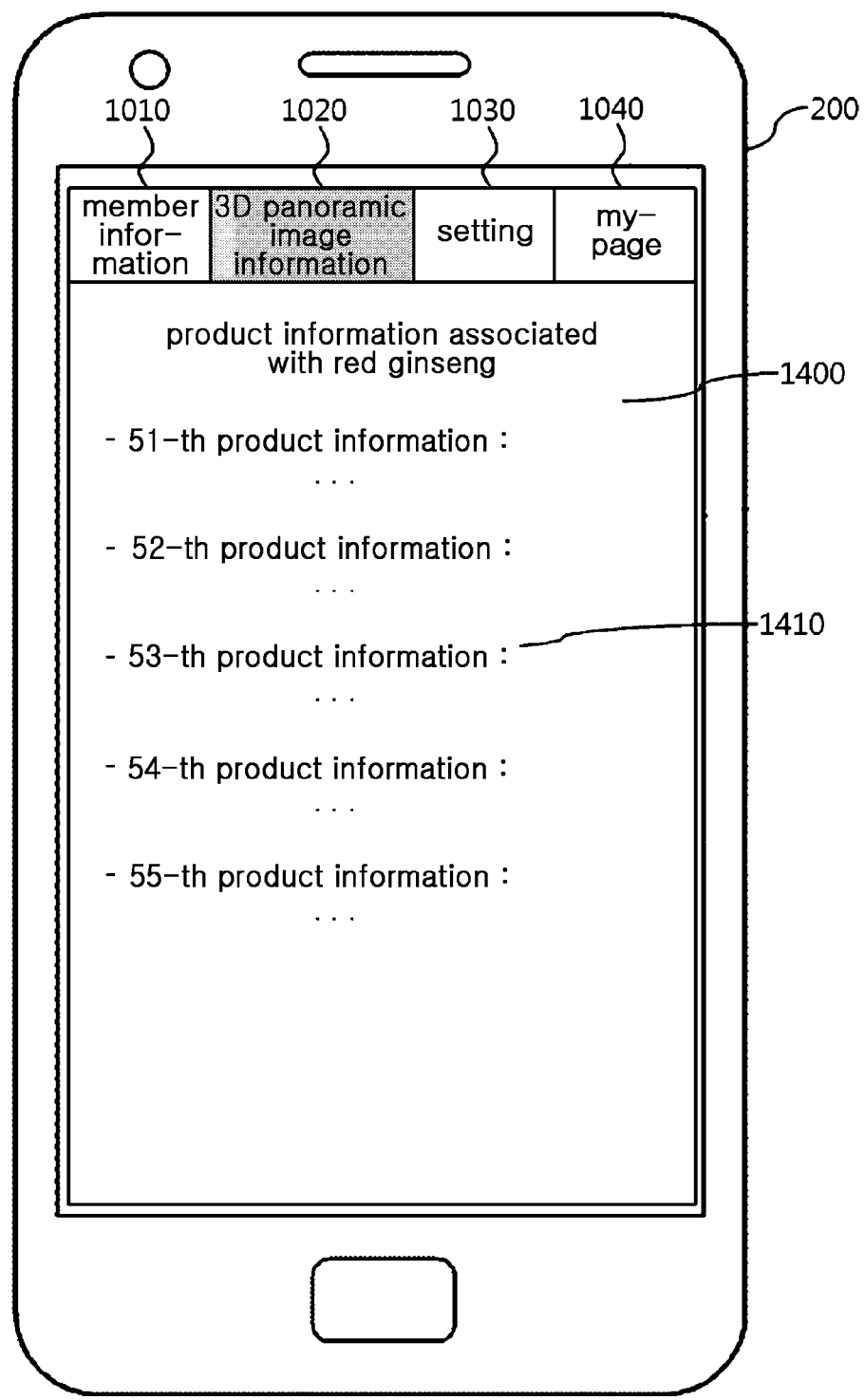

As an example, when 53-th product information 1410 is selected from the 51-th product information to the 55-th product information which is the product information associated with red ginseng illustrated in FIG. 14, the purchase terminal 200 performs the payment function for the payment price (alternatively, the price to which the discount price is applied to the cover price) corresponding to the 53-th product information 1410 by interlocking with the server 100, the payment server 300, the selling terminal 400, and the like. Further, after the payment function is normally completed, the server 100 transmits the payment function performance result to the purchase terminal 200. Further, the purchase terminal 200 stores and displays the payment function performance result transmitted from the server 100.

As another example, an oculoplastic service 1510 is selected from the information 1500 on the plurality of services (alternatively, medical subject information) provided in the first plastic surgery illustrated in FIG. 15, the purchase terminal 200 performs the payment function for the payment price corresponding to the oculoplastic service 1510 by interlocking with the server 100, the payment server 300, the selling terminal 400, and the like. Further, after the payment function is normally completed, the server 100 transmits the payment function performance result to the purchase terminal 200. Further, the purchase terminal 200 stores and displays the payment function performance result transmitted from the server 100 (S930).

Thereafter, the server 100 generates a clearance list for at least one specific product corresponding to the information on at least one specific product and service in which the payment function is perforated. Herein, the clearance list includes a product name, unique identification information of the product, an HS code, a delivery fee, tax fare information (including customs duty, additional tax, special consumption tax, standard excess values, education tax, special rural development tax, liquor tax, and the like), and the like.

Further, the server 100 transmits the generated clearance list to the purchase terminal 200 (S940).

Thereafter, the purchase terminal 200 receives the clearance list transmitted from the server 100.

Further, the purchase terminal 200 displays the received clearance list (S950).

Thereafter, the purchase terminal 200 transmits experience information from the purchase to the arrival (alternatively, coupon issued) of the corresponding specific product or specific service, evaluation information, identification information of the purchase terminal 200, and the like to the server 100, with respect to at least one specific product and service.

Further, the server 100 receives the experience information on the specific product or the specific service transmitted from the purchase terminal 200, the evaluation information, the identification information of the purchase terminal 200, and the like.

Further, the server 100 matches and stores the received experience information, evaluation information, and the like with the corresponding specific product or specific service (S960).

According to the embodiments of the present invention, as described above, a virtual reality is implemented by making a tag associated with a corresponding item or store be included in a 3D panoramic image of items displayed at a store or a store on a road view for the street, and as a result, additional information regarding offline including small shops or traditional markets on a street without an online shopping mall is transferred through the tag while providing views encountered in actual, department stores, shopping malls, streets, and the like as they are to thereby provide various information to users.

Further, According to the embodiments of the present invention, as described above, when the tag associated with the item or store is selected in the 3D panoramic image including the tag associated with the item or store, information on the item or store associated with the selected tag and shopping information of a corresponding area are previously collected and verified based on the 3D panoramic image before departing for a travel destination and an item purchase function through the 3D panoramic image and a delivery to a desired area can be performed as necessary and a payment function of a traveler dedicated prepaid multi-product discount coupon corresponding on information on a specific item or store which can be used in the travel destination among the provided information on the items or stores is performed, and as a result, users can purchase the items at lower price than natives when the user travels foreign countries, thereby improving satisfaction and convenience of a user of a corresponding terminal, which is a traveler.

According to the present invention, a virtual reality is implemented by making a tag associated with a corresponding product or a store and a traditional market without an online shopping mall be included in a 3D panoramic image of products displayed at a store or a store on a road view for the street, interested product purchase and delivery functions are performed through providing information on the product or store associated with the selected tag when the tag associated with the product or store is selected, shopping information of a corresponding area is previously collected and verified based on the 3D panoramic image before departing for a travel destination, and performs a payment function of a traveler dedicated prepaid multi-product discount coupon, as a result, additional information associated with products or stores provided offline is transferred through the tag while providing views encountered in actual, department stores, shopping malls, streets, and the like as they are to thereby provide various information to users and a function to sell and deliver products of small shops, shopping towns with dense small stores, and traditional markets on streets without the online shopping mall is performed, and as a result, the present invention may be widely used in an electronic commerce field, a shopping information providing field, a marketing field, a design field, an advertisement field, a video field, a terminal field, a server field, and the like.

Hereinabove, although the present invention is described by specific matters such as concrete components, and the like, embodiments, and drawings, they are provided only for assisting in the entire understanding of the present invention. Therefore, the present invention is not limited to the embodiments. Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirits in the equivalent range are intended to be graced by the present invention.

What is claimed is:

1. A travel destination one stop shopping system based on a 3D panoramic image, the system comprising:
 a purchase terminal transmitting to a server, when a specific code included in 3D panoramic image information transmitted from the server is selected by a user at the purchase terminal, information corresponding to unique identification information of the selected specific code, identification information of the purchase terminal and member information including at least travel destination information; and
 the server verifying one or more product and service information corresponding to the unique identification information of the selected specific code among pre-stored product and service information for each code and transmitting the one or more verified product and service information to the purchase terminal,
 wherein the server receives photographs captured by a plurality of cameras of a first image and a second image including at least one of one or more objects including stores of an offline store, products in the stores, points of purchases, leaflets, banner advertisements, board advertising, billing, and signs,
 wherein the server acquires an overlapping area where the first image and the second image overlap with each other based on the orientation of pixels with respect to the photographed first image and second image,
 wherein the server generates a preliminary panoramic image by synthesizing the first image and the second image based on the acquired overlapping area,
 wherein the server recognizes each of one or more objects included in the preliminary panoramic image,
 wherein the server adds codes corresponding to the recognized one or more objects, respectively to a partial area of an object in the preliminary panoramic image or adds the codes to be adjacent to the object to generate, by the server, the 3D panoramic image, wherein the added codes, are any one form of a barcode, a QR code, and a letter string code, and include at least one of one or more product information and one or more service information associated with the recognized one or more objects,
 wherein the server compares at least one first country number of a country number of a country corresponding to a passport number associated with the user of the purchase terminal additionally transmitted from the purchase terminal, a country number of a country corresponding to the identification information of the purchase terminal, and a country number of a country at which the purchase terminal is positioned based on predetermined positional, information of a base station at a final end, which is connected with the purchase terminal, and a second country number of a country corresponding to the travel destination information, and
 wherein the server stops a payment function for at least one specific product and service information selected among the one or more product and service information when both the first and second country numbers are the same as each other according to the comparison result or the server performs the payment function for the at least one specific product and service information selected among the one or more product and service information when both the first and second country number are different from each other according to the comparison.

2. The travel destination one stop shopping system of claim 1, wherein:
 the member information,
 further includes at least one of a name, an address, a used language, delivery destination information, and a shopping object type, and
 the product and service information, includes at least one of a product name, a service name, a product unique code, a service unique code, a product image, a service base image, product description information, service description information, experience information for a product/service, and evaluation information for the product/service.

3. The travel destination one stop shopping system of claim 1, wherein
the server
transmits, when a specific product corresponding to at least one specific product and service information selected among the one or more product and service information transmitted to the purchase terminal is a predetermined import clearance impossible product, information indicating that performing a payment function for the specific product and service information is impossible to the purchase terminal and finishes the payment function.

4. The travel destination one stop shopping system of claim 1, wherein
the purchase terminal,
displays one or more product and service information transmitted from the server, and transmits delivery information including any one of a parcel service, multi-product discount coupon issuing, and spot receipt to the server.

5. The travel destination one stop shopping system of claim 1, wherein
the purchase terminal,
applies a predetermined discount price to a cover price corresponding to at least one specific product and service information selected among the one or more product and service information, by interlocking with the purchase terminal, a payment server, and a selling terminal to perform the payment function for a price acquired by applying the discount price to the cover price.

6. The travel destination one stop shopping system of claim 5, wherein:
the purchase terminal,
receives a clearance list transmitted from the server after the payment function is normally completed and displays the received clearance list, and
the clearance list,
includes at least one of a product name for a specific product corresponding to the at least one specific product information, unique identification information of the product, a harmonized commodity description and coding system (HS) code, a delivery fee, and tax fare information.

7. A control method of a travel destination one stop shopping system based on a 3D panoramic image, the control method comprising:
transmitting, to a server from a purchase terminal, member information including at least travel destination information and one of a name, an address, a used language, delivery destination information, and a shopping object type;
transmitting 3D panoramic image information corresponding to the travel destination information in the member information to the purchase terminal through the server;
transmitting, when a specific code included in the 3D panoramic image information is selected by a user at the purchase terminal, unique identification information of the selected specific code and identification information of the purchase terminal to the server through the purchase terminal;
verifying one or more product and service information corresponding to the unique identification information of the specific code among pre-stored product and service information for each code and transmitting the one or more verified product and service information to the purchase terminal, through the server;
displaying the one or more product and service information through the purchase terminal;
transmitting delivery information including any one of a parcel service to a domestic or foreign area, multiproduct discount coupon issuing, and spot receipt to the server through the purchase terminal;
applying a predetermined discount price to a cover price corresponding to at least one specific product and service information selected, by interlocking with the purchase terminal, a payment server, and a selling terminal to perform the payment function for a price acquired by applying the discount price to the cover price, when at least one specific product and service information are selected from the one or more product and service information, through the purchase terminal; and
displaying a clearance list transmitted from the server when the payment function is normally completed through the purchase terminal,
wherein generating the 3D panoramic image information comprises:
receiving photographs captured by a plurality of cameras of a first image and a second image including at least one of one or more objects including stores of an offline store, products in the stores, points of purchases, leaflets, banner advertisements, board advertising, billing, and signs;
acquiring an overlapping area where the first image and the second image overlap with each other based on the orientation of pixels with respect to the photographed first image and second image;
generating a preliminary panoramic image by synthesizing the first image and the second image based on the acquired overlapping area;
recognizing each of the one or more objects included in the preliminary panoramic image; and
adding codes corresponding to the recognized one or more objects, respectively to a partial area of an object in the preliminary panoramic image or adding the codes to be adjacent to the object to generate the 3D panoramic image through the server, wherein the added codes are any one form of a barcode, a QR code, and a letter string code and include at least one of one or more product information and one or more service information associated with the recognized one or more objects,
wherein performing the payment function comprises:
comparing at least one first country number of a country number of a country corresponding to a passport number associated with the user of the purchase terminal additionally transmitted from the purchase terminal, a country number of a country corresponding to the identification information of the purchase terminal, and a country number of a country at which the purchase terminal is positioned based on predetermined positional information of a base station at a final end, which is connected with the purchase terminal, and a second country number of a country corresponding to the travel destination information, and stopping the payment function for at least one specific product and service information selected among the one or more product and service information when both the first and second country numbers are the same as each other according to the comparison result or performing the payment function for the at least one specific product and service information selected among the one or more product and service information when both the first and second country number are different from each other according to the comparison result.

* * * * *